United States Patent
Duckworth et al.

(10) Patent No.: US 6,178,141 B1
(45) Date of Patent: *Jan. 23, 2001

(54) ACOUSTIC COUNTER-SNIPER SYSTEM

(75) Inventors: Gregory L. Duckworth, Belmont; James E. Barger, Winchester, both of MA (US); Douglas C. Gilbert, Ledyard, CT (US)

(73) Assignee: GTE Internetworking Incorporated, Cambridge, MA (US)

( * ) Notice: Under 35 U.S.C. 154(b), the term of this patent shall be extended for 0 days.

This patent is subject to a terminal disclaimer.

(21) Appl. No.: 09/322,359

(22) Filed: May 28, 1999

Related U.S. Application Data

(63) Continuation-in-part of application No. 08/974,657, filed on Nov. 19, 1997, now Pat. No. 5,930,202.
(60) Provisional application No. 60/102,383, filed on Sep. 29, 1998, and provisional application No. 60/031,414, filed on Nov. 20, 1996.

(51) Int. Cl.[7] ............................... G01S 5/18; G01S 3/80
(52) U.S. Cl. ..................... 367/127; 367/124; 367/906
(58) Field of Search ............................... 367/908, 906, 367/118, 124, 127

(56) References Cited

U.S. PATENT DOCUMENTS

| | | | |
|---|---|---|---|
| 4,813,877 | 3/1989 | Sanctuary et al. | 434/14 |
| 5,241,518 | 8/1993 | McNelis et al. | 367/127 |
| 5,258,962 | 11/1993 | Karlsen | 367/127 |
| 5,544,129 | 8/1996 | McNelis | 367/127 |
| 5,781,505 | 7/1998 | Rowland | 367/127 |
| 5,930,202 | * 7/1999 | Duckworth et al. | 367/127 |

OTHER PUBLICATIONS

R.B. Stoughton, SAIC SENTINEL acoustic counter–sniper system, Science Applications International Corporation, SPIE, vol. 2938, Aug. 1997, pp. 276–284.

G.L. Duckworth et al., Acoustic counter–sniper system, SPIE, vol. 2938, Aug. 1997, pp. 262–275.

E.M. Carapezza et al., DARPA Counter Sniper Program, Phase I Acoustic Systems Demonstration Results, SPIE, vol. 2938, Aug. 1997, pp. 299–310.

Gregory L. Duckworth, A Robust Algorithm for Tracking of Drifting Acoustic Arrays in the Arctic, Earth Resources Laboratory, Massachusetts Institute of Technology, Jan. 1988, pp. 103–108.

* cited by examiner

Primary Examiner—Ian J. Lobo
(74) Attorney, Agent, or Firm—Leonard Charles Suchyta

(57) ABSTRACT

A low cost and highly accurate sniper detection and localization system uses observations of the shock wave from supersonic bullets to estimate the bullet trajectory, Mach number, and caliber. If available, muzzle blast observations from an unsilenced firearm is used to estimate the exact sniper location along the trajectory. The system may be fixed or portable and may be wearable on a user's body. The system utilizes a distributed array of acoustic sensors to detect the projectile's shock wave and the muzzle blast from a firearm. The detection of the shock wave and muzzle blast is used to measure the wave arrival times of each waveform type at the sensors. This time of arrival (TOA) information for the shock wave and blast wave are used to determine the projectile's trajectory and a line of bearing to the origin of the projectile. A very accurate model of the bullet ballistics and acoustic radiation is used which includes bullet deceleration. This allows the use of very flexible acoustic sensor types and placements, since the system can model the bullet's flight, and hence the acoustic observations, over a wide area very accurately. System sensor configurations can be as simple as two small three element tetrahedral microphone arrays on either side of the area to be protected or six omnidirectional microphones spread over the area to be monitored. Sensors may also be monitored to a helmet as used with the wearable system. Sensor nodes provide information to a command node via wireless network telemetry or hardwired cables for the command node comprising a computer to effect processing and display.

19 Claims, 18 Drawing Sheets

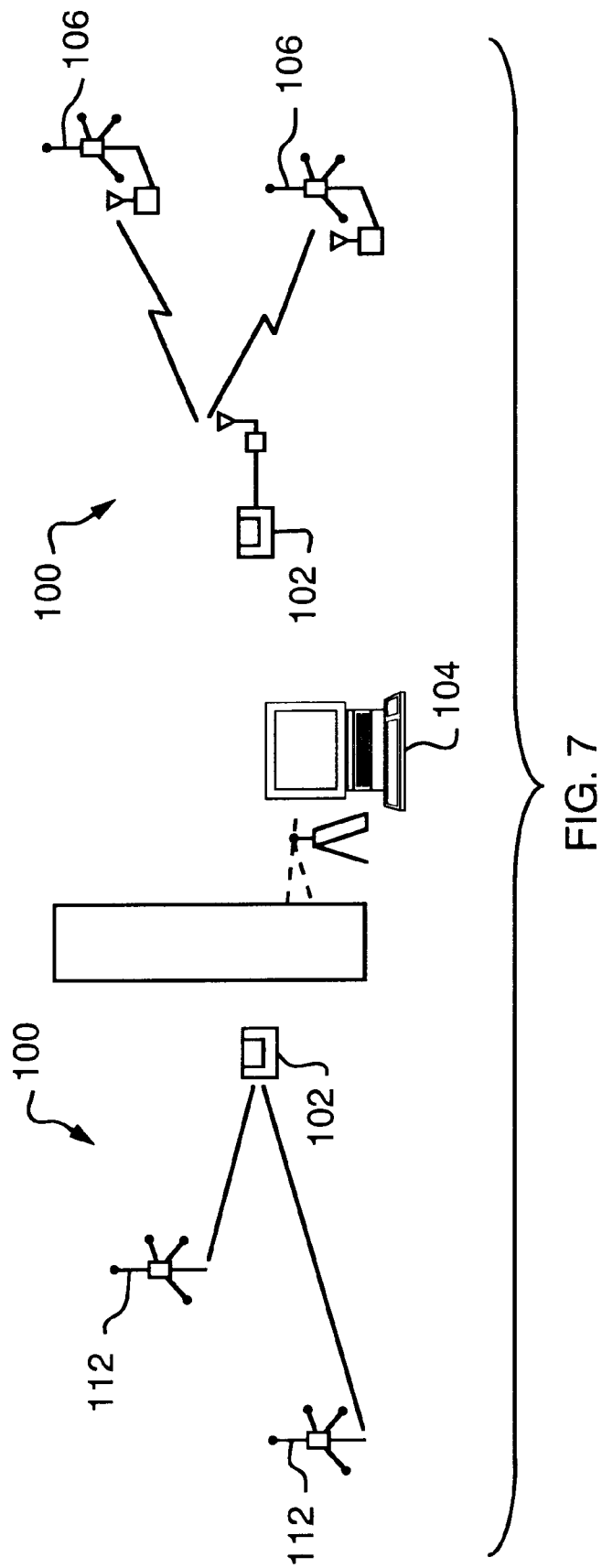

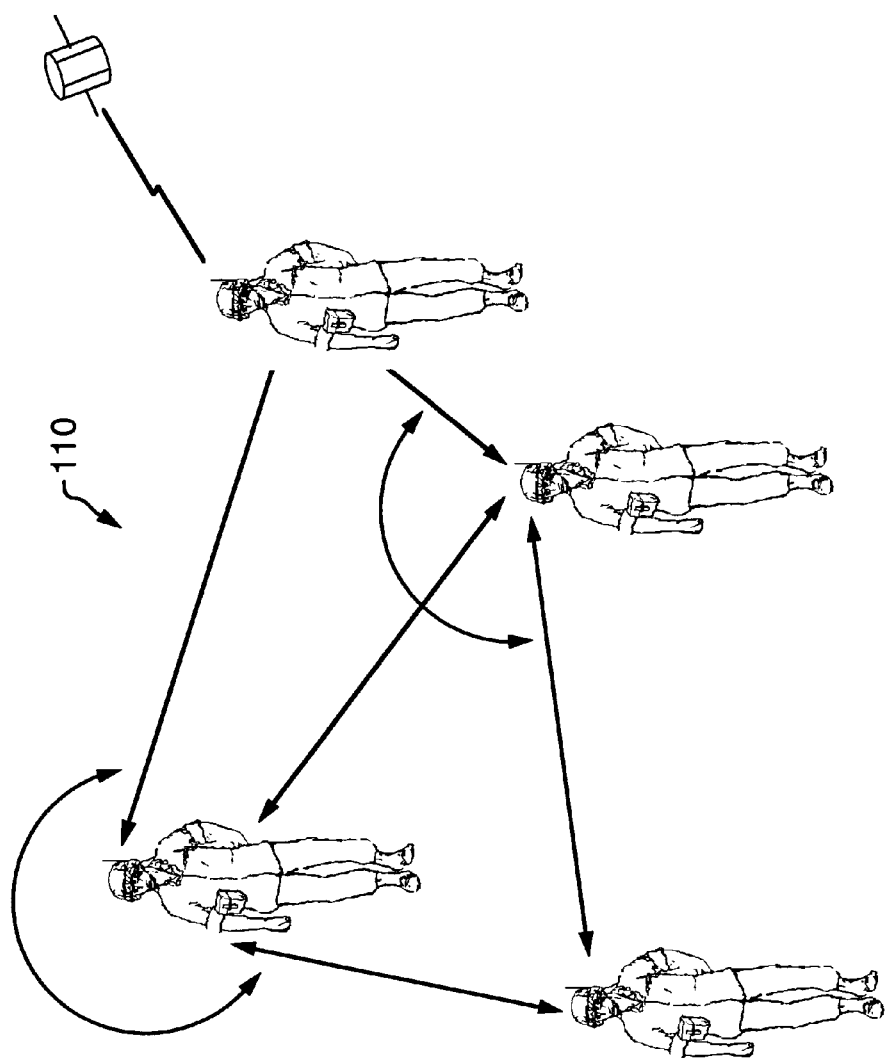
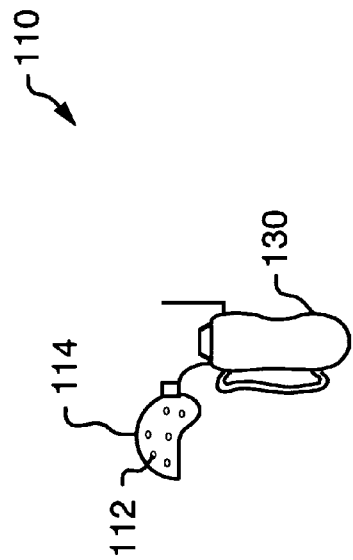
FIG. 8A
FIG. 8B

ACOUSTIC COUNTER-SNIPER SYSTEM

RELATED APPLICATION

The present application, which claims the benefit of priority from U.S. provisional application Ser. No. 60/102,383, filed Nov. 19, 1998, is a continuation-in-part of U.S. Ser. No. 08/974,657, now U.S. Pat. No. 5,930,202, which claims the benefit of priority from U.S. Provisional Application No. 60/031,414 filed Nov. 20, 1996, the contents of which are incorporated herein by reference in their entirety.

This invention was made with Government support under contract DAAL 01-95-C-0090 (DARPA Tactical Technology Office). The Government has certain rights in the invention.

FIELD OF THE INVENTION

The present invention relates to law enforcement technologies and security, and more particularly to a method and apparatus for determining the origin and direction of travel of supersonic projectiles.

BACKGROUND OF THE INVENTION

Systems are known for determining the general direction and trajectory of projectiles, such as bullets emanating from unfriendly small arms fire. One such system, described in U.S. Pat. No. 5,241,518 ("the '518 patent"), is comprised of at least three spaced-apart sensors, which are positioned to encounter the shock wave generated by a supersonic projectile. The sensors generate signals in response to the shock wave which are related to the azimuth and elevation angle of a unit sighting vector from each sensor to the origin of the shock wave. A unit vector, while having direction, has no magnitude (representative of distance in this case). Thus, the distance from each sensor to the origin of the shock wave and, hence, the trajectory remains unknown. The unit sighting vectors could point to a large number of possible actual trajectories.

It is disclosed in the '518 patent that each unit sighting vector makes the same angle with the trajectory no matter what the azimuth or elevation angle of the trajectory is, so that instead of a number of possible trajectory solutions, only one actual trajectory solution may be calculated.

The three sensors in the '518 patent implementation are capable of sequentially generating a signal in response to sequential pressure on each transducer, created by the shock wave as it encounters each transducer. The three transducers in each sensor, therefore, produce a signal which is related to the azimuth and elevation angle of a unit sighting vector for each sensor. With a combination of three such sensors, three reasonably accurate unit sighting vectors to the origin of the shock wave and hence the trajectory of the projectile can be determined.

In the embodiment, disclosed in the '518 patent, the unit sighting vectors of each sensor are determined by measuring the time when the shock wave encounters each of the transducers in a sensor. This time relationship of the three transducers provides a unit sighting vector from the sensor to the trajectory of the projectile. Based on the assumption that these unit sighting vectors form the same angle with the trajectory, the magnitude (distance in this case) of the unit sighting vectors is calculated. With the magnitude being calculated for each sensor, three points in space are defined. These three points in space will define the azimuth and elevation angle of the local trajectory of the projectile, and also an intercept with an arbitrary plane in a coordinate system. Further, with the sensors arranged as described in the '518 patent, the velocity of the projectile may be determined, and by determining the time lapse of the passing of the main shock front and an ambient density line of the projectile over the sensors, the length of the projectile can also be calculated. It is disclosed in the '518 patent, that the intensity of the main shock front, normalized to the miss-distance (i.e., the length or magnitude of the unit sighting vector), the projectile velocity, and the length of the projectile provide sufficient information so that, from known projectile characteristics (i.e. known ballistic profiles), the likely projectile itself can be determined. By knowing the projectile and its specific characteristics, and having determined its local velocity and the local trajectory, the entire trajectory can be calculated. This provides a close approximation of the position of the origin of that projectile.

Disadvantageously, the methodology described in the '518 patent requires that the sensors be relatively closely spaced in order to accommodate the known ballistic model used, which assumes that the projectile passes each sensor element at the same speed. Thus, wide spacing of the sensors using the methodology according to the '518 patent can lead to erroneous readings and false indications as to the origin of the projectile. Further, the approach described in the '518 patent uses only the shock wave produced by the projectile as it travels. The shock wave is used to extrapolate the trajectory of the projectile based on a few points in space and the time it takes the shock wave to reach those points. No use is made of information pertaining to the muzzle blast, i.e. the initial blast wave generated as the projectile is fired. Rather, the origin of the blast wave is determined based on the extrapolation of the projectile trajectory and the estimated characteristics of the projectile, which are subject to errors.

Another known system utilizes a blast wave from a fired projectile to determine the origin of the projectile, as described in U.S. Pat. No. 5,544,129 ("the '129 patent"). The system in the '129 patent is based on detection of the blast wave generated, for example, by the muzzle blast from the gun firing the projectile. The system in the '129 patent is not based on data from the projectile itself, as is the aforementioned U.S. patent, but it is based only on the data collected from the blast wave of, for example, the muzzle blast of a gun firing a bullet.

The '129 patent depends on the signals generated by the transducers forming time relationships between the transducers when the blast wave serially encounters each of three required transducers. From these time relationships, at least one unit sighting vector is determined from at least one sensor to the origin of the blast wave and that unit sighting vector is considered to point in the general direction of the origin of the projectile.

When at least two spaced-apart sensors each generates a unit sighting vector, then those two unit sighting vectors are used to determine, via a triangulation calculation, the general distance from the sensors to the origin of the projectile. Thus, by having not only the general direction of the origin of the blast wave from the sensors, but also having the general distance of the origin of the blast wave from the sensors, the location of the sniper, assassin, criminal, etc., is determined.

The '129 patent methodology uses only the muzzle blast to determine the general origin of the projectile, it does not use the shock wave at all. Disadvantageously, the acoustic signal representative of muzzle blast can easily be corrupted after it is generated, such as by attenuation or distortion introduced by structures, e.g. buildings, topology etc, in the path of the blast as it travels toward the sensors. Similarly, in a reverberant environment, multipath arrivals of the shock wave can obscure the blast wave, which always arrives later than the shock wave. A muzzle blast waveform tends to have a lower signal to noise ratio making it difficult to precisely measure its time of arrival. Moreover, silenced weapons fire will go undetected by a system such as in the '129 patent where only muzzle blast is used to determine the general origin of a supersonic projectile.

Another counter-sniper system, implemented by Science Applications International Corporation, is described in a publication entitled SAIC SENTINEL ACOUSTIC COUNTER-SNIPER SYSTEM, published in SPIE International Symposium Proceedings Vol. 2938, 1996 ("the Sentinel system"). The Sentinel system is comprised of two arrays of microphones separated by a selected distance, which provide muzzle blast and shock wave information to signal processing circuitry. Although the Sentinel system is operable with only a single array of microphones, the two array configuration is implemented to provide validity checking, redundancy and qualification. The two separate volumetric arrays each observe shock direction of arrival; shock arrival time; blast direction of arrival; blast arrival time; shock waveform period; and shock waveform amplitude. Based on these observed phenomena, signal processing circuitry is configured to derive azimuth and elevation to the shooter; range to the shooter; trajectory of the projectile; caliber of the projectile; and muzzle velocity. High algorithmic complexity and sophistication is implemented to effect these derivations.

Generally, in the Sentinel system each detected event is classified as shock, blast, or false alarm based on its waveform amplitude, period, and bandwidth. Then, shock events at each array are grouped by temporal proximity into wavefront arrivals, and similarly for blast events. These groups are then fit to plane waves, rejecting outliers and saving residuals for later confidence assessment. Median shock waveform amplitude and period for each shock wavefront are used to determine caliber and miss distance, which are then refined to solve for range and muzzle velocity. Range is determined by iterative solution of the equations relating shock and blast arrival directions and arrival time difference, muzzle velocity, projectile caliber, which in turn gives drag coefficient, and trajectory. Bearing is determined either from blast wave direction of arrival, or inferred from the trajectory and range.

Disadvantageously, the Sentinel system requires direct acoustic path measurements from both the shock wave and the muzzle blast to obtain the trajectory or the projectile origin estimate. Additionally, corruption of the muzzle data direction of arrival by shock wave multipath degrades the estimates greatly. The SAIC Sentinel System also requires a very high sample rate, high precision electronics and high quality microphones, and relatively high amounts of computational power. The need for such sophisticated components adds significant cost to the Sentinel system, and raises issues as to applications in harsh environments. It also does not use robust solution algorithms which automatically edit out bad or missing data without computation intensive conditional branching to special cases.

SUMMARY OF THE INVENTION

The present invention provides a low cost and highly accurate sniper detection and localization system. This system uses observations of the shock wave from supersonic bullets to estimate the bullet trajectory, Mach number, and caliber. Also, if available, the muzzle blast observations from unsilenced firearms are used to estimate the exact sniper location along the trajectory. The acoustic counter-sniper system according to the present invention may be utilized in a fixed position or in another embodiment, be portable, that is, a wearable counter-sniper system.

According to the invention, an acoustic system for sniper localization (System) utilizes a distributed array of acoustic sensors to detect the arrival times, amplitudes and frequency characteristics of a projectile's shock wave and the muzzle blast from a firearm. The detection of the shock wave (and muzzle blast) is used to measure the wave arrival times of each waveform type at the sensors. This time of arrival (TOA) information for the shock wave can be used to determine the projectile's trajectory: azimuth, elevation, and intercept with an arbitrary plane in the system coordinate frame. With the foregoing and additional information from the muzzle blast, an accurate location of the origin of the projectile and a line of bearing to the origin of the projectile are determined.

In further accord with the invention, a newly developed and very accurate model of the bullet ballistics and acoustic radiation is used which includes bullet deceleration. This allows the use of very flexible acoustic sensor types and placements, since the system can globally model the bullet's flight, and hence the acoustic observations, over a wide area very accurately.

Features of the invention include that it is inexpensive to assemble and operate and that it is easy to implement. System sensor configurations or sensor nodes can be as simple as two small three element microphone arrays on either side of the area to be protected, or six omnidirectional microphones spread over the area to be monitored. Increased performance can be obtained by expanding the sensor field in size or density, and the system software is easily reconfigured to accommodate this at deployment time. Sensor nodes can be added using wireless network telemetry or hardwired cables to a command node processing and display computer. A key feature of the system is its ability to estimate bullet trajectory from the shock wave alone, allowing the system to perform well even when the muzzle blast is masked, shadowed, silenced or otherwise distorted. When muzzle blast observations are available the present invention can estimate the exact sniper location along the trajectory. The present invention also provides a very accurate method for calculating the projectile caliber. Selecting the correct caliber and therefore the correct ballistic coefficient ($C_b$) is important as trajectory calculations according to the invention are based on the projectile type.

The present invention utilizes waterproof, low-bandwidth, inexpensive and simple sensors with integrated low-power electronics and processing. The disclosed invention only requires mechanically undemanding arrays, and low-precision sensor orientations and locations. The invention uses processing algorithms which easily accommodate more or less data on a shot by shot basis, and which automatically detect and eliminate poor quality or inconsistent data.

In addition to the cost, power, and area coverage/microphone advantage of a distributed system according to the invention, it is also fundamentally more robust than solitary array solutions. Additional sensors may be added to improve performance or coverage in difficult terrain seamlessly. With the system implementations according to the invention some sensors may fail without degrading efficacy significantly. Furthermore, since inter-sensor data rates are small, and the signal processing burden is light, computation may easily be distributed to multiple sites even to the individual soldier level, further enhancing the system's robustness.

According to the invention, a wearable acoustic counter-sniper system is disclosed. This wearable system utilizes inexpensive acoustic sensors and a practical helmet mounting system which provide adequate counter-sniper capabilities. In this system, the concept of muzzle wave is of less importance than with the fixed systems described herein. Since intentional muzzle countermeasures and/or blockage by topographic or urban features is likely, a system which does not rely on detecting the muzzle blast, either alone, or in combination with the shock wave is needed.

The wearable counter-sniper system provides robust and high-accuracy estimation of both bullet trajectory and shooter location, ease of reconfiguration to handle different threats and system deployment scenarios and implementation using robust and inexpensive sensors and processing.

Both the fixed and wearable systems very accurately calculate projectile trajectories and projectile origins. Due to the high accuracy and ease of implementation of the present invention, it will create a safer environment for individuals at risk by significantly increasing their ability to pinpoint and avoid or eliminate an imminent threat.

BRIEF DESCRIPTION OF THE DRAWING

The foregoing and other features and advantages of the present invention will be more fully understood from the following detailed description of illustrative embodiments, taken in conjunction with the accompanying drawing in which:

FIG. 7 is an illustration depicting configuration options of the fixed acoustic counter-sniper system according to the present invention;

FIGS. 8a and 8b are illustrations depicting the wearable fixed acoustic counter sniper system according to the present invention;

DETAILED DESCRIPTION

Generally, an acoustic system for sniper localization (System) according to the invention utilizes a widely distributed array of acoustic sensors to detect the leading edge of a projectile's shock wave and the muzzle blast from the apparatus used to launch the projectile, for instance a rifle. The detection of the shock wave and muzzle blast is used to measure the wave arrival times of each waveform type at the sensors. This time of arrival (TOA) information for the shock wave and blast wave can be used to determine the projectile's trajectory and a line of bearing to the origin of the projectile.

Although ideally the shock waveform contains useful information about the distance the shock wave has propagated, realistically the shock waveform will often be contaminated by ground reflections and forward scattering and other multipath propagation's so that localization should not rely heavily upon information extracted from shock waveform shape or duration. Thus for trajectory estimation the system relies primarily upon measuring arrival time of the waveform based on leading edge detection as the leading edge is not corrupted by multipath propagation.

These same sensors can be utilized to localize the muzzle blast if it is sufficiently audible at the sensors and if a direct path signal component is available. The ability to localize the muzzle blast is used in conjunction with the shock wave information to very accurately locate the projectile's origin. It is important not to rely solely on muzzle blast to locate the projectile's origin, as it is possible to silence this blast. Furthermore, in the event that manmade structures (e.g. buildings) or natural structures (e.g. hills) are in the way, the muzzle blast will be attenuated. Muzzle blast waveforms also tend to be noisy which makes it difficult to precisely measure time of arrival. Therefore, in the system according to the invention muzzle blast information is used secondarily to the shock wave information.

Figure 1:
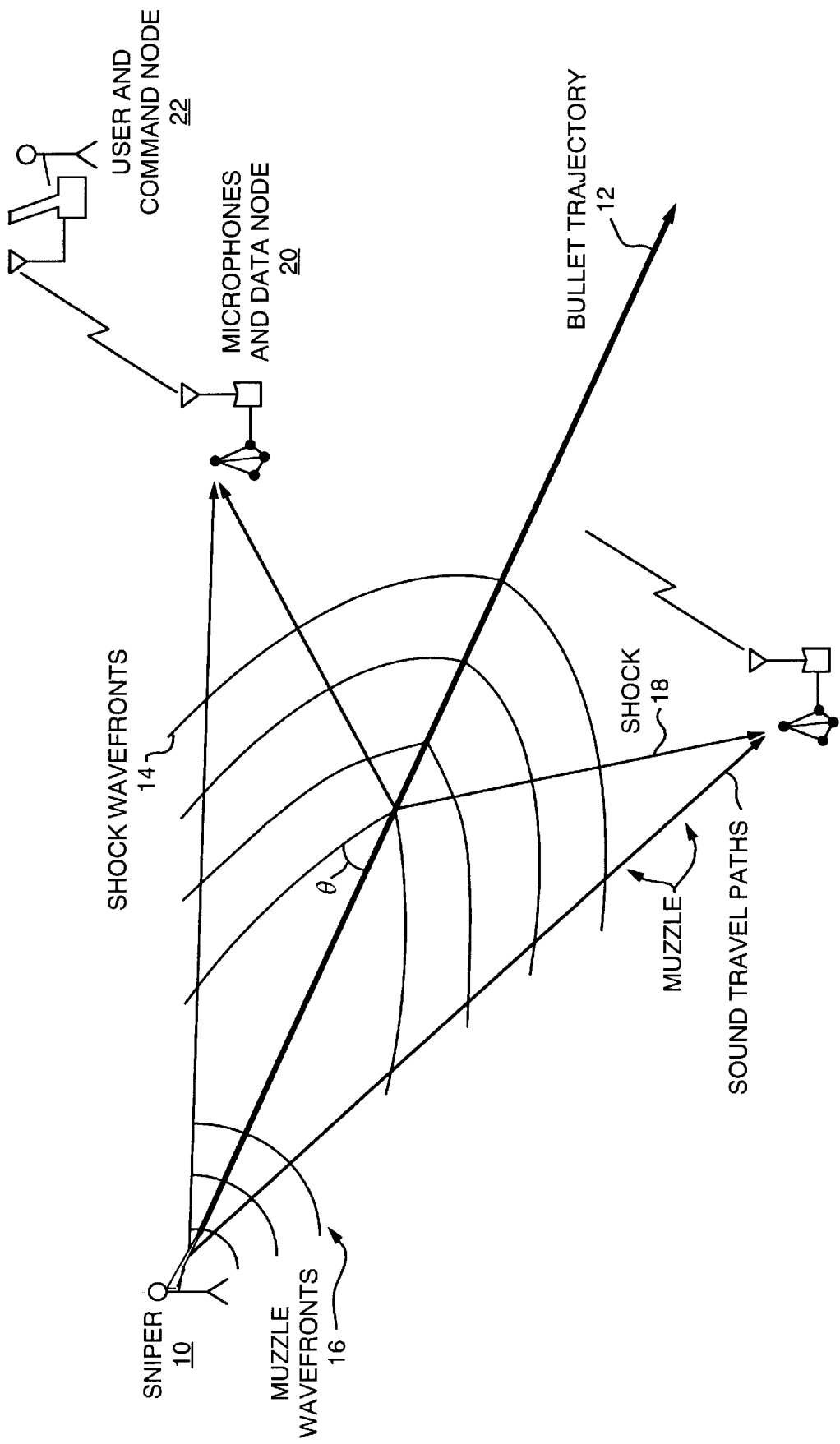
FIG. 1 is an illustration showing the concepts underlying the acoustic counter sniper system according to the invention and depicting the acoustical disturbances generated by a supersonic projectile.

An acoustic counter sniper system according to the invention is generally illustrated in FIG. 1. To simplify this conceptualization of the illustrative embodiment only two sensors are shown, however more can be used. In FIG. 1 a sniper 10, fires a bullet that travels at a supersonic velocity, utilizing for instance a modern high-powered rifle. The supersonic bullet generates a characteristic bipolar shock wave 14 continuously along the bullet trajectory 12. The impulsive sound from the shock wave 14 propagates from the bullet trajectory 12 as an expanding conical wavefront with cone angle (theta, $\theta$) being a function of the Mach number or speed of the bullet. When an unsilenced firearm is used by the sniper 10, muzzle blast waves 16 are also produced. The bullet trajectory 12 can be determined from relative times of arrival by the shock wave 14 at and within the sensor nodes 18, 20. The number of sensor nodes 18, 20, in this illustrative embodiment, is six or more omnidirectional or two or more directional spatially separate sensors, with a minimum of three transducers per directional sensor. The point of origin of the projectile, i.e. sniper position, can be determined through computations performed on a processor constituting the command node 22, by projecting the local trajectory back through space until a location that can support a "marksman" is encountered. The exact sniper position along the trajectory is computed when the muzzle blast wave is detected.

Figure 2A:
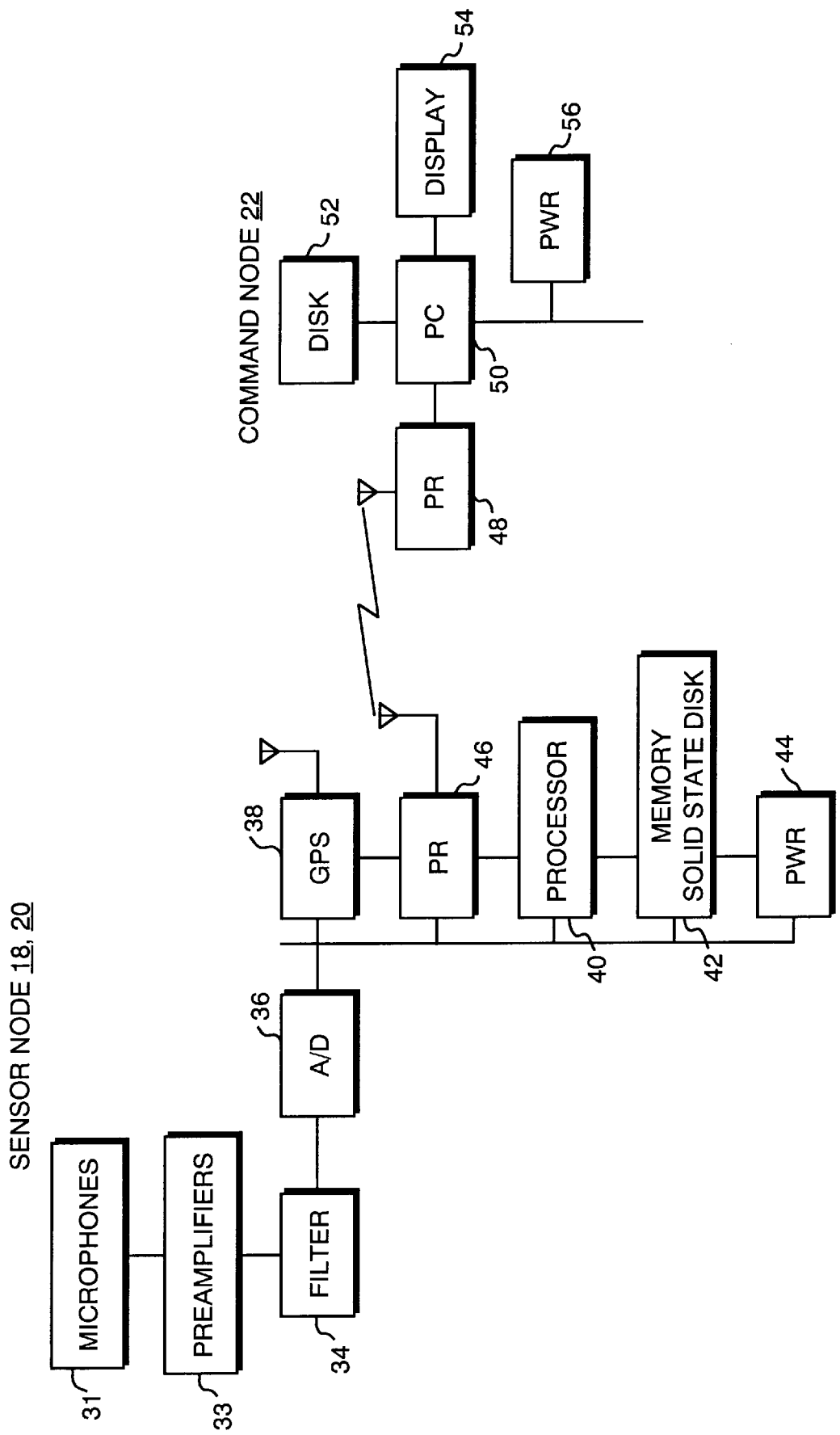
FIGS. 2a and 2b are block diagrams of the system hardware comprising the acoustic counter sniper system according to the invention.

FIG. 2a illustrates the hardware comprising the command node 22 and each of the sensor nodes 18, 20 for an embodiment which uses wireless communications. Each of the sensor nodes 18, 20 collects and processes waveform information and in turn communicates that information to the command node 22. The command node 22 receives information from the sensor nodes 18, 20 and processes and correlates it along with information from other sensor nodes 18, 20. In this embodiment the sensor nodes 18, 20 are each composed of three or more transducers, such as microphones 31, for collecting pressure wave information. A preamplifier 33 amplifies the pressure wave information and provides it to an anti-aliasing filter 34 which suppresses unwanted harmonics. An analog to digital (A/D) converter 36 receives the filtered pressure wave information and transforms the analog waveform information into digital time series information. Each sensor node 18, 20 also has a GPS receiver 38 to receive global positioning and time synchronization information. A microprocessor 40 receives and processes the raw time series information from the A/D converter 36. A sensor node packet radio 46 is used to send processed waveform information to the command node 22. Each sensor node 18, 20 has a sensor node power source 44, that is preferably a battery. A solid state flash disk and memory interface 42 is provided to the System to hold static program and parameter information, and executable programs and data, respectively.

Continuing to refer to FIG. 2a, the command node 22 receives information, including GPS information and processed waveform information, from the sensor nodes 18, 20 through a command node packet radio 48. The command node 22 is further comprised of a PC 50 which processes the information from the sensor nodes 18, 20. A disk 52 and a display 54 serve as peripheral support for the PC 50. The command node 22 also has a command node power source 56 to run the command node 22.

Figure 2B:
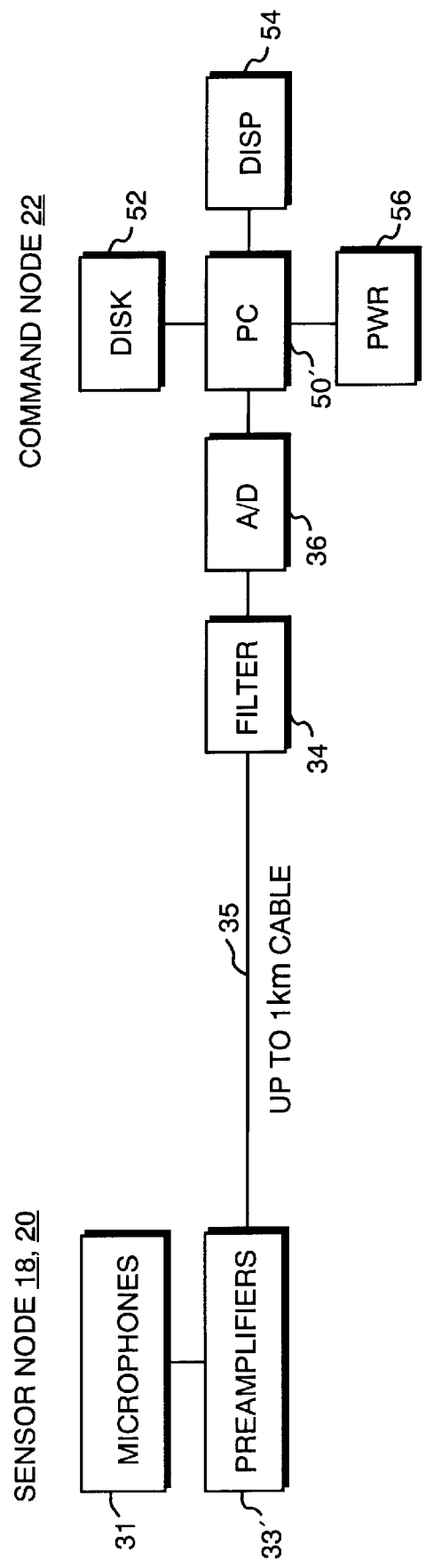

FIG. 2b illustrates the hardware for the command node and sensors for a hardwired embodiment of the system. The sensor preamplifiers 33 are capable of transmitting their data over standard twisted pair cable 35 for up to one kilometer to the command node A/D converters 36. In this embodiment, the PC 50 at the command node implements the functionality resident at the data nodes (18, 20) in FIG. 2a, as well as the functionality of the command node 22 in FIG. 2a.

Figure 3:
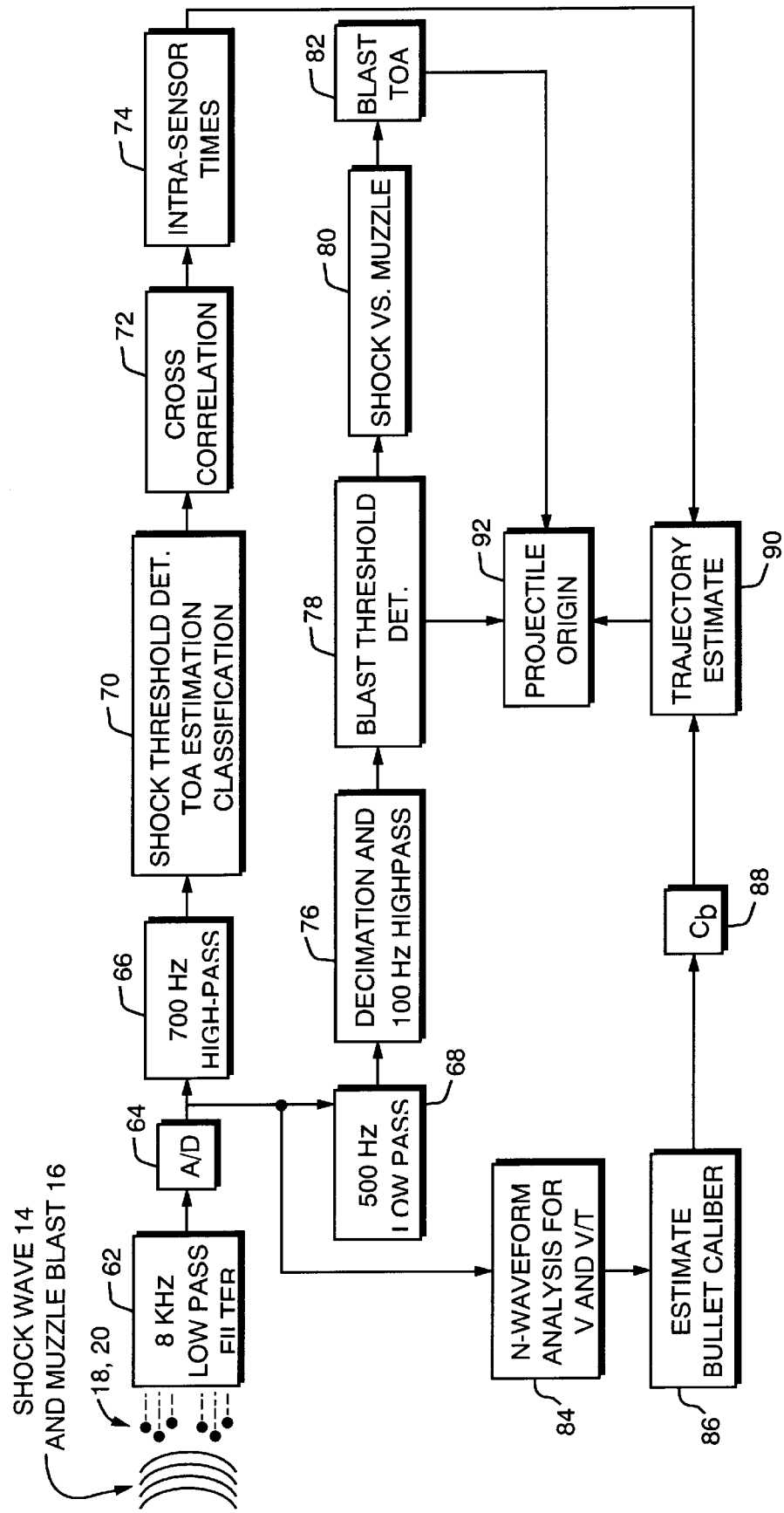
FIG. 3 is a block diagram of the functionality of the acoustic counter sniper system of FIGS. 1 and 2.

Referring now to FIG. 3, shock wave 14 and blast waveform 16 information is received at a plurality of system microphones 60. In this illustrative embodiment, there are two sensor nodes of which sensor nodes 18, 20 were exemplary as discussed hereinbefore with respect to FIGS. 1 and 2. Each of the sensor nodes is comprised of four transducers in a tetrahedron configuration (tet). The shock wave 14 and muzzle blast wave 16 are transduced by each of the sensor nodes and passed through the filter 34 which is illustratively an 8 kHz low-pass filter. Subsequent to filtering, the analog wave forms are converted by an analog to digital converter 64 into digital bit streams containing time and amplitude information. The resulting time series information is fed into both a 700 Hz hi-pass filter 66 and a 500 Hz low-pass filter 68. The output of the 700 Hz hi-pass filter 66 is utilized by the system to process shock wave 14 information. The output of the 500 Hz low-pass filter 68 is utilized by the system to process blast wave 16 information.

In the region where it exists, the shock wave from a supersonic projectile always arrives before the muzzle blast waves. The information from the 700 Hz high-pass filter 66 is sent to a shock threshold detector 70, using a CFAR (Constant False Alarm Rate) detector as is known in the art. In the event that the first signal received by one of the sensor nodes contains shock wave information, the shock threshold detector 70 records the arrival time of this waveform (TOA) at each transducer for each sensor node. Next, the system utilizes a method, as known in the art, to cross-correlate 72 the four waveforms from each sensor node to determine relative shock wave arrival time information 74, which is stored away for later use by the system. Cross-correlations are typically used for intra-node arrival times due to the stable transducer geometry and waveform consistency within a node of modest aperture.

A waveform received by one of the sensor nodes that contains muzzle blast wave 16 information of interest is filtered in two steps with decimation in between. After passing through the 500 Hz low-pass filter 68, the information is decimated and then passed through a 100 Hz hi-pass filter 76. Next, the result of this filtering process is passed to a blast CFAR (constant false alarm rate) threshold detector 78 where the time of arrival of the blast wave 16 is detected and amplitude information is stored for shock/muzzle discrimination. Such a blast CFAR threshold detector 78 is well understood by those skilled in the art and will not be described here in detail. Since there is considerable leakage from the shock wave 14 and its echoes into the 100–500 Hz band, all the threshold crossings are considered only potential muzzle blast 16 detections and must undergo classification 80 as either shock waves 14 or muzzle blasts 16 or neither. Briefly, if the output of the 700 Hz high-pass filter 66, i.e. the shock filter, exceeds the output of the 500 Hz low-pass filter 68, i.e. the muzzle filter, then the event is discarded as a non-muzzle blast wave. If the waveform is classified as a muzzle blast 16, the muzzle blast time of arrival 82 is then stored for use in later calculations of projectile origin 92. If the waveform information is not classified as a muzzle blast then the information is discarded. This muzzle blast time of arrival information 82 is used to calculate range information or the point along a projectile's trajectory that is the origin of the projectile.

The ballistic coefficient ($C_b$) 88 is also needed in order to make accurate trajectory calculations. The $C_b$ 88 is arrived at indirectly by estimating the bullet caliber as follows. Continuing to refer to FIG. 3, the time series information from the analog to digital converter 64 undergoes N-waveform analysis 84 to determine the peak voltage (Vp) and N-wave slope (V/T). Experimental results indicated that there is a direct relationship between Vp, V/T, and S; the slant range over which the N-wave propagated in air. Both Vp and V/T of the shock wave 14 are easily measured by means well known in the art. The average of Vp and V/T are calculated for each tet and the tet with the minimum average V/T is selected for subsequent calculations. Choosing the minimum V/T reduces chances of using data which were overloaded on the microphones. Six estimated slant ranges, S, are calculated (one set of three based on the Vp measurement and another set of three from the V/T measurement for each of 22, 30, and 50 caliber bullets). The bullet caliber is estimated 86 by selecting the caliber which predicts the smallest difference between its two sets of slant ranges. With the caliber of the bullet determined, the $C_b$ 88 of the projectile is known, as each projectile of a particular caliber has its own unique $C_b$.

The equations used for the six slant range calculations will be described below. The equations used to calculate the slant ranges as a function of caliber from the peak voltage, Vp, are:

50 Cal: $S_1 = 8.37\ Vp^{-1.592}$

30 Cal: $S_1 = 3.06\ Vp^{-1.692}$

22 Cal: $S_1 = 1.41\ Vp^{-1.848}$

The equations used to calculate slant ranges as a function of caliber from the N-wave slope are:

50 Cal: $S_2 = 100\ (V/T)^{-1.11}$

30 Cal: $S_2 = 160\ (V/T)^{-1.67}$

22 Cal: $S_2 = 140\ (V/T)^{-2}$

Where the sensor sensitivity is equal to 0.01 volts/Pa, and the anti-alias filter has a $6^{th}$ order Butterworth character with 6350 Hz 3 dB point.

In the above equations, those elements of the equations represented by numbers are empirical constants. They were derived by making many measurements of Vp and V/T as projectiles passed a well calibrated sensor, at a known location, at a known distance.

In general a simplified theoretical relationship between the peak voltage and acoustic propagation slant range takes the form:

$$S_1(V_p, \text{caliber}) = a_{caliber} V_p^{b_{caliber}}$$

where $a_{caliber}$ and $b_{caliber}$ depend on sensor sensitivity vs. frequency and bullet caliber. These coefficients can be determined theoretically or empirically by a least squares inverse problem for $a_{caliber}$ and $b_{caliber}$ fitting predicted $S_1$ data to measured slant ranges for a number of shots.

Similarly, the theoretical relationship between the N-wave slope and acoustic propagation slant range takes the form:

$$S_2(V/T, \text{caliber}) = \frac{\rho c^3}{2.4} \left( \frac{V}{T} \alpha_{caliber} \right)^{-\beta_{caliber}}$$

where $\rho$ is the ambient air density, c is the speed of sound, and $\alpha_{caliber}$ and $\beta_{caliber}$ depend on sensor sensitivity vs. frequency and caliber. These coefficients can also be determined theoretically or empirically by a least squares inverse problem fitting predicted $S_2$ data to measured slant ranges for a number of shots.

For any given shot, the $S_1$ (V, caliber) and $S_2$ (V/T, caliber) are compared for each trial caliber. At the correct caliber, the difference $|S_1 - S_2|$ is minimized, and that caliber is used for our estimate. It is significant that although these relationships are based on theory, the finite bandwidth of the measurements, and the particular algorithms used for estimating peak voltage and maximum N-wave slope from digitized time series lead to relationships whose coefficients are best determined using these empirical fits which include these effects. Additionally, training data which use the exact types of ammunition expected to be detected can maximize caliber/ammunition classification performance.

Next, referring again to FIG. 3, the $C_b$ 88 and shock waveform arrival times at six or more transducers are used to calculate an estimate of the projectile's trajectory 90. This process is generally known as Model-Based Parameter Estimation described in the system in greater detail hereinafter. Finally, the observations of the blast wave are used in conjunction with the previously calculated estimate of the projectile's trajectory to determine the range to the shooter. This range estimation effectively locates the projectile's origin 92 along the estimated trajectory 90.

In general, the present invention utilizes a modified version of the Model-Based Parameter Estimation technique known as the Levenberg-Marquardt method of non-linear least squares to estimate the trajectory of a projectile. This is a well known method for estimating the best solution to equations with multiple unknown parameters. Given the observed intra-sensor and inter-sensor relative arrival times of shock waves at least a total of six transducers, and given that the model in this case is a Time Difference Of Arrival (TDOA) model which predicts the relative shock wave arrival times at each transducer, it is possible, using the Levenberg-Marquardt (L-M) method, to arrive at the best solution to the five or more equations, which in this case is very accurate trajectory information.

A Time of Arrival (TOA) model, which is described in detail hereinafter, is based on a very accurate ballistic model developed for the present invention. Differences between times of arrival from the TOA model constitute the TDOA model used hereinbefore. This TOA model was not developed in the traditional empirical manner. Rather, this model is based on certain physical characteristics relating to the projectile, including: the air density (which is related to temperature); the Cartesian position of a rifle (for instance); the azimuth and elevation angles of the rifle muzzle; the muzzle velocity of the projectile (mach number); and the speed of sound (which varies with temperature/air density). All of these parameters were considered for the derivation of this novel ballistic model. With this ballistic model, it is possible to very accurately calculate, at any particular point in space, the exact time at which the shock wave and muzzle blast reach that particular point in space. The first equation for this model is the ballistic travel time:

$$t(x) = \frac{C_b}{2(1-n)}[(V_0^n - 2nx/C_b)^{(n-1)/n} - V_0^{n-1}]$$

Figure 4:
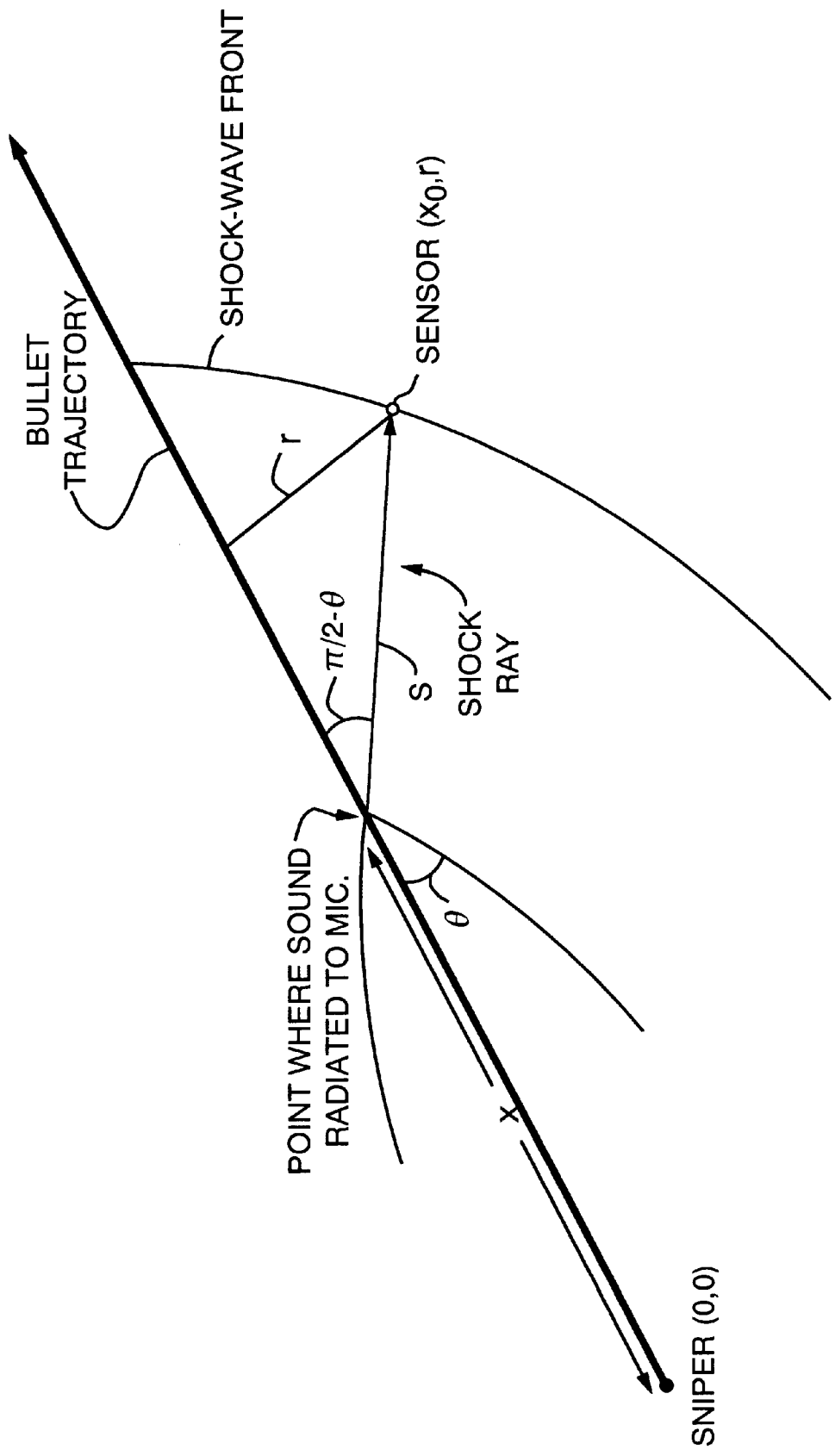
FIG. 4 is an illustration of the use of TOA model.

Where, referring to FIG. 4:

t (x) is the time it takes for the bullet to travel a distance x along its trajectory;

$C_b$ is the ballistic coefficient and is a constant for any particular type of projectile;

n is a ballistic constant and was calculated to be 0.514 (typically this constant is known in the art to be 0.5); and $V_0$ is the velocity of the projectile at the rifle muzzle, x=0.

The development of the ballistic travel time model was done in the following manner. The drag force, F, is represented in the conventional way using a drag coefficient $C_d$, and this force acts to decelerate the bullet having mass m, hence $$F = \frac{1}{2}\rho A V^2 C_d = -m\frac{dV}{dt}.$$

It is known that the drag force for supersonic bullets is much greater than for subsonic ones, so that it can be postulated that the sound radiation (the shock wave) dominates the drag. By equating the rate of sound power radiated to the loss of kinetic energy, the drag coefficient is found to be given by a remarkably simple relationship involving the bullet radius $R_0$ and its Witham function, $F(\xi)$, which is a function of the entire shape profile of the bullet.

$$C_d = (2/R_o^2) \int (F(\xi))^2 d\xi$$

$$F(\xi) = 1/2\pi \int (2/\alpha R(u))^{1/2} H((\xi - u)/\alpha R(u)) d(A(u)/du),$$

$$\alpha = (M^2 - 1)^{1/2}$$

Where R(u) is the bullet radius as a function of distance along its length, A(u) is the bullet cross sectional area as a function of distance along its length, and H(u) is known in the art as tabulated in Witham, G. B., "The Flow Pattern of a Supersonic Projectile," *Commun. Pure Appl. Math*, Vol. 5, 1952 (see pp 301–348), which is incorporated herein by reference.

By carrying out the indicated Reiman-Stieltjes integral, over the range of Mach number extending from 1.1 to 3.0, it is found that the drag coefficient is given by the simple relationship $C_d = \kappa M^{-0.514}$, where $\kappa$ is a different constant for each caliber bullet. Popular empirical ballistics models are based on drag coefficients having similar relationships, but use a value of –0.5 for the Mach number exponent.

The development of the TOA model from the ballistics model is illustrated in FIG. 4. The time of arrival is equal to the time it takes for the bullet to get to the point were sound is radiated from it toward the microphone, t(x), plus the time that it takes the shock wave to get from its radiation point to the microphone, S/c. Thus:

$$t = t(x) + S/c,$$

where $$x = x_0 - r(M^2 - 1)^{-1/2}$$

The ballistic travel time model gives the first of these two times, t(x), and the second is given by:

$$\frac{S}{c} = \frac{r}{c}(1 - M^{-2})^{-\frac{1}{2}}$$

yielding $$t = \frac{C_b}{2(1-n)}\left[(V_0^n - 2nx/C_b)^{\left(\frac{n-1}{n}\right)} - V_0^{n-1}\right] + \frac{r}{c}(1 - M^{-2})^{-\frac{1}{2}}$$

where $$M = \frac{1}{c}(V_0^n - 2nx/C_b)^{1/n}$$

is the bullet Mach number at distance x where the shock wave is radiated, and $$C_b \frac{4m}{\kappa} \rho A c^n$$

is the ballistic coefficient. The constant n=0.514 is derived above. The second time is simply the slant range distance, s, divided by the speed of sound, c. The distance s is related to the closest point of arrival (CPA) distance, r, by $r = s \cos(\theta)$, where $\theta$ is the Mach angle, and where $\sin(\theta) = 1/M$.

The mathematical model that predicts the arrival time of a shock wave at any general point in space as a function of the full set of parameters is the TOA model. It is derived from physical principles, and constitutes a precise ballistic model that has an accuracy of approximately 10 parts per million (ppm). Existing ballistic models, all empirically derived, have nominal 1 m accuracy at 1 km, or 1000 ppm.

Figure 5:
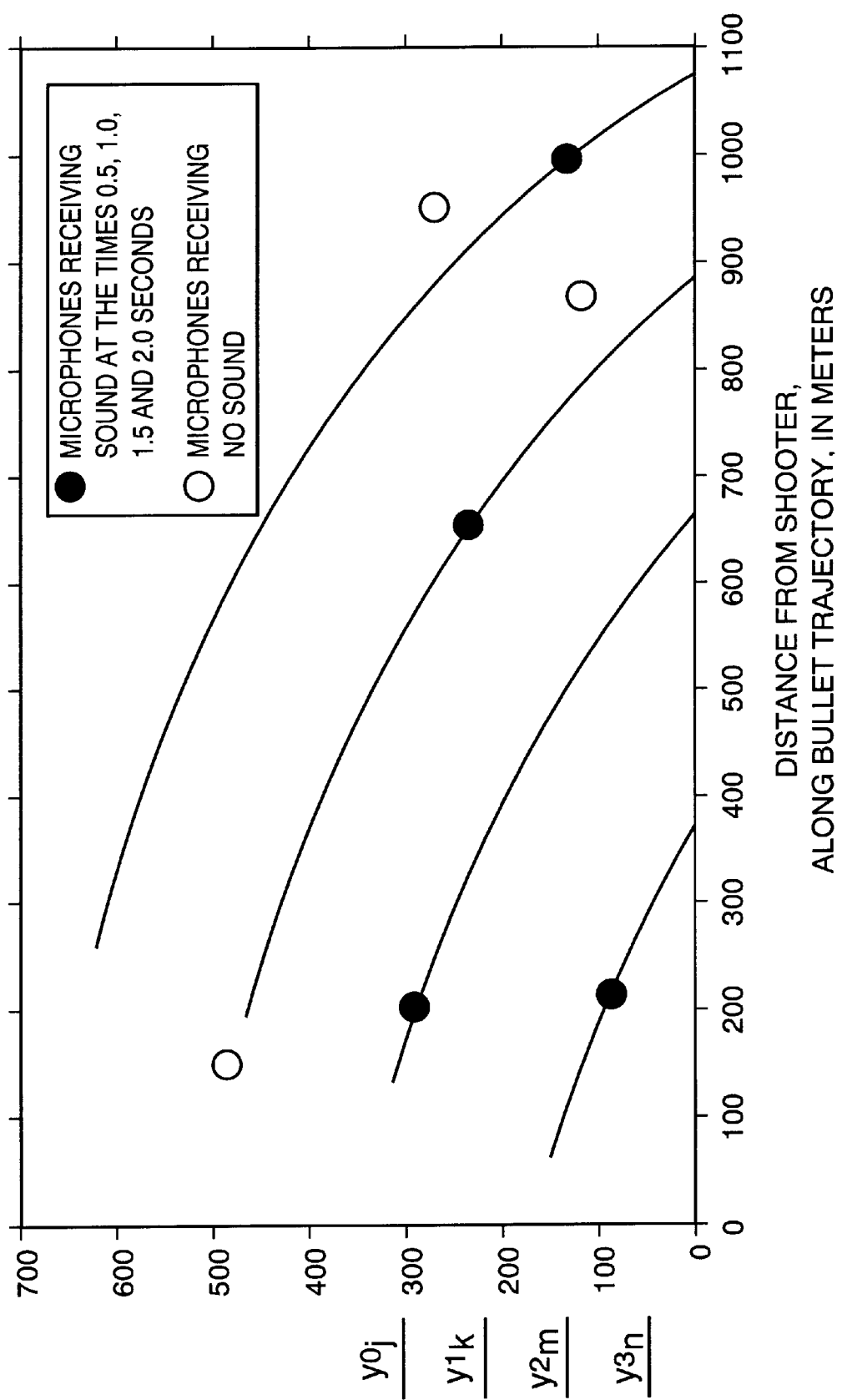
FIG. 5 is an illustration modeling the shock wave time of arrival (TOA)

The use of the TOA model is illustrated in FIG. 5. An exemplary 30 caliber bullet trajectory is coincident with the abscissa, and it is fired at zero time from the origin at Mach 2.7. The locus of the shock wave, in the plane of the trajectory, is shown at four successive times (0.5, 1.0, 1.5, 2.0) seconds. Microphones represented by the four black circles receive the shock wave at the four successive plotted times. The two microphones represented by white circles to the right receive the shock wave at different times, while the microphone on the left never receives a shock wave, because it is in a shadow zone. The wavefront loci become increasingly more curved as time progresses, due to the slowing down of the bullet because of the drag force acting upon it. It is this slowing down of the bullet that must be predicted accurately by the ballistic model.

For the present invention to provide the desired accuracy while allowing the use of inexpensive omnidirectional sensors, low system sampling rates, and low frequency filters it was necessary to sample information from a relatively wide aperture (long base line) and to use this very accurate ballistic model. As it is possible to measure the position of the sensors in space to within about 1 cm, the ballistic model was required to provide trajectories that are at least this precise.

Given this TOA model, observations of the time of arrival of a shock-wave, and $C_b$, the only parameters left unknown, and which need to be estimated, are the azimuth and elevation angle of the rifle muzzle, the coordinates (y,z) of the trajectory intercept on a reference plane in an earth based (e.g. map or grid) coordinate system, and the projectile's Mach number, M, at some location along the trajectory, typically at the reference plane.

As indicated, there would be at least six transducers in the illustrative system, distributed in one of a number of ways. With six or more observations of a shock wave it is necessary to make six or more separate calculations based on the equation for the TOA model. So it is necessary to solve five or more equations with five unknowns. In the TDOA model, six absolute measurements are reduced to five relative measurements. As mentioned, the L-M method is used to arrive at the estimate for the five unknowns that best solve the five or more equations. The parameter estimation calculation is started with an initial set of the five parameters. This initial set of parameters can be selected in a number of different ways as will be described in detail hereinafter. After the trajectory has been estimated, the difference between the shock-wave arrival time and the muzzle blast arrival time is used, together with the trajectory information, to estimate the origin of the projectile along the trajectory. This is done by making the muzzle TOA equal to the shock-wave TOA minus the observed time interval between the shock wave and the muzzle wave. The muzzle TOA is simply the range from the hypothesized shooter location along the trajectory to the transducer location, divided by the speed of sound, c.

To reduce the impact of TOA measurement error, redundant measurements should be made; that is, to make more measurements than are required by the number of unknowns. Occasionally, a large error will occur in just one or a few of these measurements, as might be caused by equipment malfunction, spurious noise or reverberation detections, or non-line of sight acoustic paths. The present invention uses the so-called L1 modification to the L-M algorithm to detect and to remove these outlier data from the calculation.

The TOA model itself incorporates the ballistic model derived from physical principles. The five parameters being estimated are the trajectory azimuth and elevation angles, the two (y, z) coordinates of the trajectory intercept of a reference plane, and the bullet Mach number. The "model based parameter estimation" calculation is started with a starting or initial set of these five parameters. Once the five parameters have been estimated by the L-M estimator, the difference between the shock wave arrival time and the muzzle blast wave arrival time is used, together with the trajectory model, to compute where along the trajectory the shooter was located. Bullet caliber is determined with the use of the six equations that relate to the sensor filter output peak voltage V and the slope of voltage V/T to slant range, S, for 22, 30 and 50 caliber bullets. The caliber with the closest predicted ranges, by the V and V/T methods, is selected.

There are many ways to estimate the five starting or initial trajectory parameters for the purpose of starting the "model-based parameter estimation" calculation. Four methods are described hereinafter.

In a first method the slant range, S, of the trajectory to each sensor can be calculated from peak voltage from the output of the low-pass filter (also called anti-aliasing filter). The Closest Point of Approach (CPA) distance, r, can then be calculated for each sensor by estimating the nominal Mach number, $M_0$.

$r = S \tan(\theta)$, when $\sin(\theta) = 1/M_0$

Next the line that best fits as a tangent to each of the spheres of radius r centered at each sensor is taken as the trajectory estimate. The set of five parameters that describe this line can be used to start the L-M calculation.

In a second method, which is applicable if the two sensors are groups of transducers (like the tetrahedrons), the direction of the shock-wave normal is measured by both of them. Then the slant range, S, is computed using the above $S_1$ or $S_2$ relationships described hereinbefore to fix two points in space, and the trajectory estimate parameters are determined based on a line drawn between the two points. This may clearly be extended to include a least squares or a least absolute value line fit to points in space defined by more than two sensors.

In a third method, a global search is used as a systematic way of covering the entire parameter space to find a nearly correct solution. First, each of the five parameters is quantized over a range of its possible values. Next, the sets of quantized parameters are rank ordered in order of probability of occurrence. Finally, each set is tried in order. The 'cost function' (some function of the estimation errors, which are the differences between TDOA's observed and those predicted by the TDOA model using the estimated five parameters), is computed for each set of starting parameters.

The set producing the lowest cost function is taken to represent the starting set for the L-M parameter estimation problem.

In a fourth method just the time difference between arrival of the shock wave at two sensors, plus the ratio of the amplitudes of the peak voltages for the outputs of their low-pass filters can be used to estimate the trajectory. To make this work well, the trajectory elevation must be nearly zero, (which is almost always true), and at least one of the two sensors should be able to tell from which side the shock is coming from. Using just the time difference between the tets and the ratio of pressure amplitudes received at the tets provides a quick estimate of trajectory as a starting solution for two tetrahedron systems (tets). The estimate can be used for a starting solution for the parameter estimator. The present invention assumes a plane geometry, such that the bullet is in the plane of the sensors. Modest trajectory altitude will affect the precision, but precision is not sought here; the full parameter estimator overcomes inaccuracies of this initial starting guess. The geometry is defined in terms of the x, y coordinates of the two sensor locations.

All four methods described provide coarse starting points. Any of them can be augmented by a fine-grained search. When augmented by additional candidate parameter sets, the final starting set is selected by the cost function procedure described hereinabove. In the present illustrative embodiment, the second method is used (as described in details hereinafter), and if that method fails the third method is used.

The algorithms for detection and classification are described hereinafter. As shown in FIG. 3, the time series data is high pass filtered via an elliptical filter with a cutoff frequency of 700 Hz. This removes any low frequency noise and DC bias problems while maintaining the essence of the N-wave. After filtering, the data is squared to get the instantaneous power. The average noise power at sample i is estimated by averaging 64 samples of the preceding squared data offset by an additional ten samples:

$$N_s(i) = \frac{1}{K_s} \sum_{k=1}^{K_s} X_s^2(i - M_s - k + 1)$$

where $K_s = 64$ and $M_s = 10$, and $X_s$ is the high pass filtered time series data. The instantaneous signal to noise ratio, snr, is then calculated:

$$snr_s(i) = \frac{X_s^2(i)}{N_s(i) + \sigma_s}$$

where $\sigma_s$ is the minimum allowed standard deviation. The snr is compared to a threshold which is potentially data dependent. It is either a user entered snr threshold or 12 dB down from the maximum snr for the data set, whichever is greater. This variable threshold avoids the problem of detecting early on structure-borne wave propagation seen in the tetrahedral. The first sample crossing the threshold is declared to be the shock wave arrival time.

The peak voltage level, V, and the slope of the N-wave, V/T, are found using the unfiltered data and the shock wave arrival time found as described hereinabove. One millisecond of data is extracted from the raw time series starting two samples prior to the detection sample. This "snippet" is then interpolated to eight times its resolution via zero padding in the frequency domain (known in the art as band limited interpolation). The maximum value of the first half of the N-wave is found from this interpolated data. Only the first half of the N-wave is examined to reduce the chances of noise/echo contamination. The first half of the N-wave is found by looking for the first "zero" crossing where "zero" is defined by the average of the first two raw data samples before the leading edge of the N-wave. The first zero crossing is restricted to being greater than 70 μsec after the start of the N-wave to avoid spurious crossings.

The value of V/T is also calculated from the interpolated data:

$$\frac{V}{T} = \max_i \left[ \frac{X_s(i) - X_s(i+M-1)}{(M/(Nf_s))} \right]$$

where N is the padding factor, eight, M is the slope calculation lag, sixteen, and $f_s$ is the sample frequency, 20 kHz in this embodiment.

The arrival times determined by the threshold crossing are relatively coarse. Finer resolution time difference of arrivals, for the shock wave arrivals, are determined within a tetrahedron or other multi-transducer sensor via cross correlation between the channels. One millisecond of data is extracted from the raw time series starting at the shock wave detection sample. The snippet from the first channel on which a detection occurs is then cross-correlated with the snippets from the remaining channels in which a shock wave detection occurs. The data are interpolated eight times during the cross-correlation process and the index of the cross-correlation peak gives the difference time of arrival between the two channels to a resolution of ⅛ the sample period.

The muzzle blast detection is done on band-pass filtered data. For improved speed, the filtering is done in two steps with decimation in between. The data are first lowpass filtered using a Chebyshev filter with a cutoff frequency of 500 Hz. The data are then decimated by sixteen and highpass filtered using an elliptical filter with a cutoff frequency of 100 Hz. The decimation factor was chosen based on the cutoff frequency. After filtering, the data are squared to get the instantaneous power. The average noise power at sample i is estimated by averaging 64 samples of the preceding squared data offset by an additional four samples:

$$N_m(i) = \frac{1}{K_m} \sum_{k=1}^{K_m} X_m^2(i - M_m - k + 1)$$

where $K_m = 64$ and $M_m = 4$ and $X_m$ is the band pass filtered time series, in this illustrative embodiment.

The instantaneous signal to noise ratio, snr, is then calculated:

$$snr_m(i) = \frac{X_m^2(i)}{N_m(i) + \sigma_m}$$

where $\sigma_m$ is the minimum allowed standard deviation. The snr is compared to a threshold which is user defined. The number of threshold crossings is then reduced by requiring that there be more than two samples between one threshold crossing and the previous one; i.e., only the first in a sequence of threshold crossings is taken.

Since there is considerable leakage from the shock wave and its echoes into the 100–500 Hz band, all the threshold crossings are considered only potential muzzle blast detections and must be classified as either shock wave or muzzle blast. The classification is done by comparing the high frequency energy (700 Hz and up) to the energy in the low frequency band (100–500 Hz) as described hereinbelow.

The low frequency energy, $E_{LF}$, is calculated from the low frequency bandpass filtered data over a 10 msec window starting at the threshold crossing index:

$$E_{LF}(i_m) = 16 \sum_{k=1}^{K_{LF}} X_m^2(i_m + K_{LF} - k)$$

where $K_{LF}$ is the integer $\geq 0.01 f_S$, $X_m$ is the bandpass filter data from the muzzle detection step, and $i_m$ is the set of muzzle threshold crossings obtained above. The number 16 is the desampling factor set as described hereinabove.

The high frequency energy, $E_{HF}$, is calculated from the noise power $N_s(i)$ estimated using the shock wave detection band described hereinabove. This gives a window length of ~3.2 msec which is more than adequate to capture the energy of the shock wave which should be less than 1 msec in duration.

$$E_{HF}(i_m) = \sum_{k=1}^{K_s} X_s(16(i_m - 1) - i_\tau + K_s - k + 1)$$

where $X_s$ is the high-pass filtered data and $K_s$, $M_s$ and $N_s$ are the variables defined in the shock wave detection section. The variable $i_\tau$ is the estimate of the filter delay introduced by the muzzle bandpass filter. The delay was experimentally estimated to be about 1.8 msec. The number 16, again, is the desampling factor.

The muzzle detection time is defined to be the first threshold crossing that meets the following criteria:
1) $E_{LF}(i_m) > \alpha E_{HF}(i_m)$, and
2) the threshold crossing time > shock detection time + 10 msec.

The energy comparison factor, α, is 1 and was experimentally determined. The 10 msec. blocking window on the muzzle detection is to avoid detecting on early shockwave reverberation.

The algorithms for bullet caliber identification, trajectory estimation, and sniper localization are further described hereinafter. The observations (inter and intra-tetrahedron arrival times, peak shock wave voltage, and N-wave slope) are input into a top level module which then builds, via another code module, the observation subsets required by other modules. The bullet caliber is then estimated and a set of initial trajectory estimates are made. The "lowest cost" trajectory of that set is chosen as the initial estimate. The cost is calculated via a call to an estimator function requesting just the cost function to be evaluated. After the initial trajectory estimate is found, it is refined by another call to the estimator using just the shock wave observations. Once the trajectory is estimated, it is fixed and a final call is made to the estimator using the muzzle blast observations to find the sniper position.

The bullet caliber estimation used the shock wave observations of peak voltage, V and the N-wave slope, V/T. The average of V and V/T are calculated for each tetrahedron (tet) or other sensor configuration, and the tet with the minimum average V/T is selected for subsequent calculations. Choosing the minimum V/T reduces chances of overloading on the microphones. Six slant ranges for each sensor (range from the tet to the shock wave radiation point) are then calculated (based on equations as set forth hereinbefore): three from the V observation for 22, 30 and 50 caliber bullets, and three from V/T for the same bullets. The caliber with the smallest difference between its two slant ranges is chosen.

The equations for slant range as a function of V were derived experimentally. The equation for slant range as a function of V/T is theoretically bullet independent, but experimental data has shown bullet dependencies for finite bandwidth data. Thus the equation for slant range as a function of V/T is implemented including those dependencies.

Figure 6:
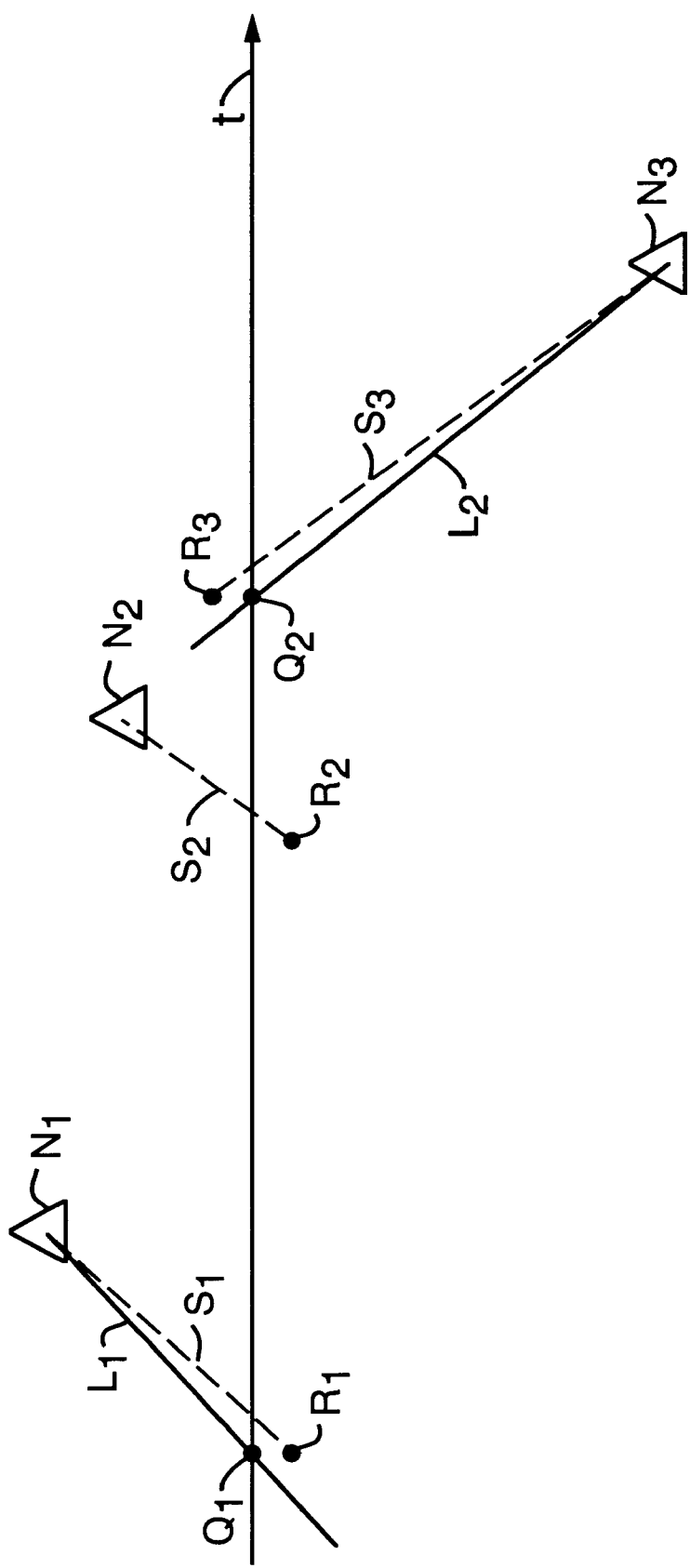
FIG. 6 is an illustration of the calculation of slant range and wavefront perpendicular from average peak voltage and inter-tet arrival time.

The initial trajectory estimation uses the tet reference element and intra-tet arrival times and the peak voltages from the shock wave. For each tet, the slant range is calculated from the average peak voltage and a wavefront perpendicular is calculated from the intra-tet arrival times by fitting a plane wave. These are illustrated in FIG. 6 with the tetrahedra represented by triangles ($N_1$, $N_2$, $N_3$) the estimated wavefront perpendiculars by the dashed lines ($S_1$, $S_2$, $S_3$), and the slant range by their length. The trajectory radiation points are the ends of the dashed lines ($R_1$, $R_2$, $R_3$). The radiation times are the tet reference element arrival times less the travel time from the radiation point to the tet. A line, t, is least squares fit to the radiation points and two points on this line are chosen, $Q_1$ and $Q_2$, such that they are closest to the radiation points with the first and last radiation times by dropping a perpendicular to t. New wave front perpendiculars are drawn from these points ($L_1$ and $L_2$).

A set of likely trajectories is derived by varying the slant range along $L_1$ and $L_2$ from $Q_1$ and $Q_2$ to their respective tets by ±20% in steps of 5% and connecting each pair of points. Variables in a module control the number of slant range points. The direction of the trajectory is controlled by the projected radiation time for each of the points. Note that this method is different from that described in the '518 patent discussed hereinbefore in that direct measurements of slant range are used to determine the radiation points, not an assumption of constant bullet speed.

The nominal bullet velocity (and hence mach number) in the vicinity of the tets is calculated from the distance between radiation points divided by the radiation time difference for each trajectory. This estimated mach number is then projected back to $M^o$, the mach number when the trajectory crosses the y-z plane.

In this illustrative embodiment, two types of checks are performed on each potential trajectory. First, if the projected radiation times are within 3 msec. of each other (~1m), the trajectory unit vector is defined to be the mean of the wavefront vectors. The nominal mach number is defined as the inverse of the dot product of the trajectory unit vector and one of the wavefront unit vectors. Secondly, trajectories may be thrown out if:

1) their elevation angle does not lie within the range of −15° to 30° inclusive, or
2) their nominal mach number does not lie in the range of 1<M≦2.8, or
3) the dot product of the wavefront vectors and the trajectory vector is ≦0.

A third check is done on the projected $M^o$: if $M^o$>2.8, $M^o$ is set to 1.8.

It is entirely possible that all trajectories may be rejected via the criteria of the second check. This would be especially likely to happen if the initial slant ranges are long due to overloading. In this case, a set of trajectories is generated by gridding the state space. The six trajectory azimuths are selected: (−75:30:75) plus the azimuth of the line drawn between the elements with the first and last arrival times. The elevation angle is set to 0°. The y-axis intercept, $y^o$, is varied between −50 m to 50 m in steps of 20 m. The z axis intercept set is [3, 13] m and the intercept mach number, $M^o$, set is [1.1, 1.5, 2.0, 2.5]. This produces a set of 144 possible initial trajectories. The gridding method may also be chosen if there were not at least two tets with valid shock wave detections on all four elements.

At this point, the set of trajectories produced by one of the above procedures is augmented by appending the initial state. The final step of the trajectory initialization process is to reduce the set of possible initial trajectories down to one. This is done by evaluating the cost function for each trajectory in the set and choosing the one with the lowest cost. The cost function, E, is:

$$E = \sum_i \left| \frac{t_i - \hat{t}_i}{\sigma_t} \right| + \sum_j \left| \frac{\tau_j - \hat{\tau}_j}{\sigma_\tau} \right|,$$

where the $t_i$ and $\hat{t}_i$ are the measured and predicted arrival times at each sensor relative to the reference sensor, the $\tau_j$ and $\hat{\tau}_j$ are the relative intra-tet (intra-sensor) arrival times, and the $\sigma_t$ and $\sigma_\tau$ are the respective measurement standard deviations. The $\sigma_t$ are user defined. The $\sigma_\tau$ are set to $\sigma_t/8$ to reflect the higher accuracy of the crosscorrelation processing.

The trajectory is estimated using the shock wave arrival times. The observables are the arrival time differences between each element and a reference element. Generally, there are two types of arrival time differences: those between omniphones (or one of the tetrahedral elements) and those within a tet. The observables are created differently for each type and there are separate reference elements to keep track of, but otherwise they are handled in the same manner by the estimation algorithm.

A module is used in the code to create the observables matrices. The intra-tet arrival time differences having been calculated during the detection process merely need to be extracted and checked. The estimation algorithm assumes that all four elements of the tet have valid shock wave detections and the first element is the cross-correlation reference element . This is not a requirement of the algorithm itself, but is a function of the coding.

The omni-style sensor observables are created by subtracting the reference element's arrival time from the remaining elements' arrival times. For this type of observable, one element of the tet (the cross-correlation reference phone) is treated as an omniphone. Therefore, even in a system with no omni-phones, there is at least one measurement that is considered an omni-style observable. Note that even if the intra-tet arrival times have been declared "bad" as described above, there will be an omni-style measurement if at least one of the elements of the tet has a valid shock wave detection. The omni reference element is chosen as the element with the median arrival time. This reduces the chance of choosing an element with a false detection as the reference element.

After the trajectory has been estimated, the status flag and the final cost are checked. If a status flag indicates if there were insufficient observables for the estimation process or if it did not converge, a message is printed indicating that there is no solution, and the localization code is exited. If the final estimation cost is greater than the initial cost, the localizer also prints a message indicating that there is no solution, and exits.

After the trajectory has been estimated, those parameters are fixed and, if there are any muzzle blast detections, the range is estimated by another call to the estimation module. There are two types of observables used in the range estimation: the omni-style muzzle blast relative arrival times, calculated in a manner similar to the shock wave omni-style observables, and the difference between the muzzle blast and shock wave arrival times for all elements. For a two tet system, there would be up to one measurement of the first kind and up to eight of the second kind.

After the range is estimated, if it is, the status flag is checked. If it did not converge, the localizer prints a message indicating that there is no solution, and exits.

The estimation algorithm implemented for trajectory and range estimation is a variant of the Levenberg-Marquardt method of non-linear least squares. The variation is in the weighing of the residuals. The weighing method used gives an L1 type solution: i.e., minimum absolute value instead of squared error. The weights at each iteration are recalculated using the size of the residuals to effectively "throw out" outliers. The weights, $?_{i,k}$ for element i on iteration k, are calculated by:

$$\xi_{i,k} = \sigma_i \sqrt{q_{i,k} \sum_m q_{m,k}^{-1}}$$

the $\sigma_i$ are the user defined measurement standard deviations and the $q_{i,k}$ are calculated from the residuals by:

$$q_{i,k} = \max\left(\left|\frac{r_{i,k}}{\sigma_i}\right|, q\min\right).$$

The $r_{i,k}$ are the residuals, $(y_i - \hat{y}_{i,k})$ for the $k^{th}$ iteration and $q_{min}$ is a small positive number, typically set at $10^{-9}$, and $y_i$ is the $i^{th}$ measurement ($t_i$ or $\tau_i$) and $\hat{y}_{i,k}$ is the model predictions for that datapoint on the $k^{th}$ iteration of the L-M algorithm. The L1 Levenberg-Marquardt algorithm is as follows:

1. Compute the residuals, weights, and the initial cost, $E_0$, $$r_{i,o} = (y_i - \hat{y}_{i,o})/\xi_{i,o}$$

$$E_0 = \sum_m |r_{i,o}|$$

where the $y_i$ are the measurements and $\hat{y}_{i,0}$ are the estimated values at the initial state estimate, $x(0)$.

2. For the $k^{th}$ iteration, calculate the elements of the weighted derivative matrix, H:

$$H_{ni} = \frac{1}{\xi_{i,k}} \frac{\partial y_n}{\partial x_i}\bigg|_{x(k-1)}$$

3. Calculate the next estimate of x by solving for δx and adding it to the current x:

$$x(k) = x(k-1) + \delta x,$$

where $$(H'H + \lambda I)\delta x = H' r_k$$

and λ is initially set to $10^{-10}$. $r_k$ is the vector of weighted residuals based on the previous estimate with elements:

$$r_{i,k} = \frac{y_i - \hat{y}_{i,k}}{\xi_{i,k}}\bigg|_{x(k-1)}$$

4. Calculate the new weights, weighted residuals, and cost, $E_k$, at the new state, $x_k$.

$$E_k = \sum_i |r_{i,k}|$$

5. If the cost is greater than the previous cost, discard this estimate of x(k), increase λ by a factor of 10, and repeat from step 3.
6. If the cost is less than the previous cost and the solution has not converged, decrease λ by a factor of 10 and repeat from step 2.

There are three ways of exiting the iteration loop: reaching convergence, going the maximum number of allowed iterations (set at 50), or having λ increase to its allowed limit (set at $10^{80}$). Convergence is defined by the ratio of the new cost, to the previous cost x(k)/x(k-1). If the ratio is between 0.9995 and 1, we are either at a local minimum or are in a flat valley of the cost function surface and might as well stop. A status flag is returned indicating which condition occurred.

Additional nuances are the bounding of the mach number and the elevation angle after each estimate of x. The Mach number at the intercept is bounded to be between 1.01 and 2.7 inclusive. The elevation angle is bounded to be between −15° and 30° inclusive, when this is appropriate for the local conditions.

The radiation Mach number (the Mach number of the bullet at the point in the trajectory from which the shock wave emanates) is calculated for each iteration of the estimator. This is done in an iterative estimation. For each iteration, the mach number estimate is bounded to be greater than or equal to $1+10^{-6}$. Iteration continues until either the maximum number of allowed iterations is reached (k=20) or the change in mach number is less than $10^{-3}$. As implemented, the iterative estimation is vectorized over nodes, and the convergence check is on the largest change over all the mach numbers.

The underlying equations for the estimator are unstable when the trajectory is parallel to the North-South axis. This condition may be handled, however, by coordinate rotation prior to doing the estimation and re-rotating the results afterwards. The need for rotation is determined by the azimuth of the initial trajectory estimate. If the azimuth angle is within 0.4 radians (23°) of the y-axis, the system is rotated and estimation proceeds normally. The estimated results are then rotated and extrapolated back to the original coordinate system. This may result in very large values for the intercept mach number since it is a simple extrapolation with no bounds check and may intersect very far up the y axis. The y and z intercepts may also appear to be very large, even though the estimation problem was well behaved, if the trajectory is nearly parallel to the y-axis.

In a second illustrative embodiment, moving convoy protection requires the mounting of sensors on moving vehicles. This scenario may require that wind noise abatement be applied to the sensors for muzzle detection. However, the high acoustic level and broadband characteristics of the shock wave make this and engine noise a minimal problem. Two or more vehicles are necessary to implement this distributed array concept. Reasonable precision relative location, such as that available from real-time differential GPS, is adequate for sensor location as long as the baselines among sensors are large compared to the GPS errors (approximately 1–3 m). Array sensor orientation using commercially available magnetometers and level sensors is problematic on vehicles because of their high accelerations on rough roads and magnetic distortion, but omni sensors on a large number of vehicles avoids this problem.

Alternatively, a strapdown gyro can be used, although this may add significantly to the cost. It is also possible to use larger surface-mounted arrays for single-vehicle solutions in the vehicle coordinate frame, though the noise problems increase and vehicle shadowing of the acoustic waves is potentially a problem.

In a third illustrative embodiment, small unit and individual soldier operations pose a unique opportunity for an acoustic sniper system according to the invention because of the ruggedness, low cost, and low volume and power requirements of the acoustic solution. If six or more soldiers operate in close proximity (e.g. within a 200 m radius) individual omni microphones on their helmets with data shared among them by RF communications, and localized by differential GPS (or equivalent) would provide adequate performance. Helmet omni sensors are also attractive in that they do not require orientation sensors to determine the helmet array's attitude. However, requiring a minimum of six soldiers poses an overly restrictive scenario. To get around this, the helmet can be used as a platform for a flush mounted multi-microphone array. This is adequate for both accurate distributed localization using shared data from two or more such helmets (supported by GPS and head orientation sensors), and for a lower quality single-helmet solution using shock and muzzle observations.

Figure 12A:
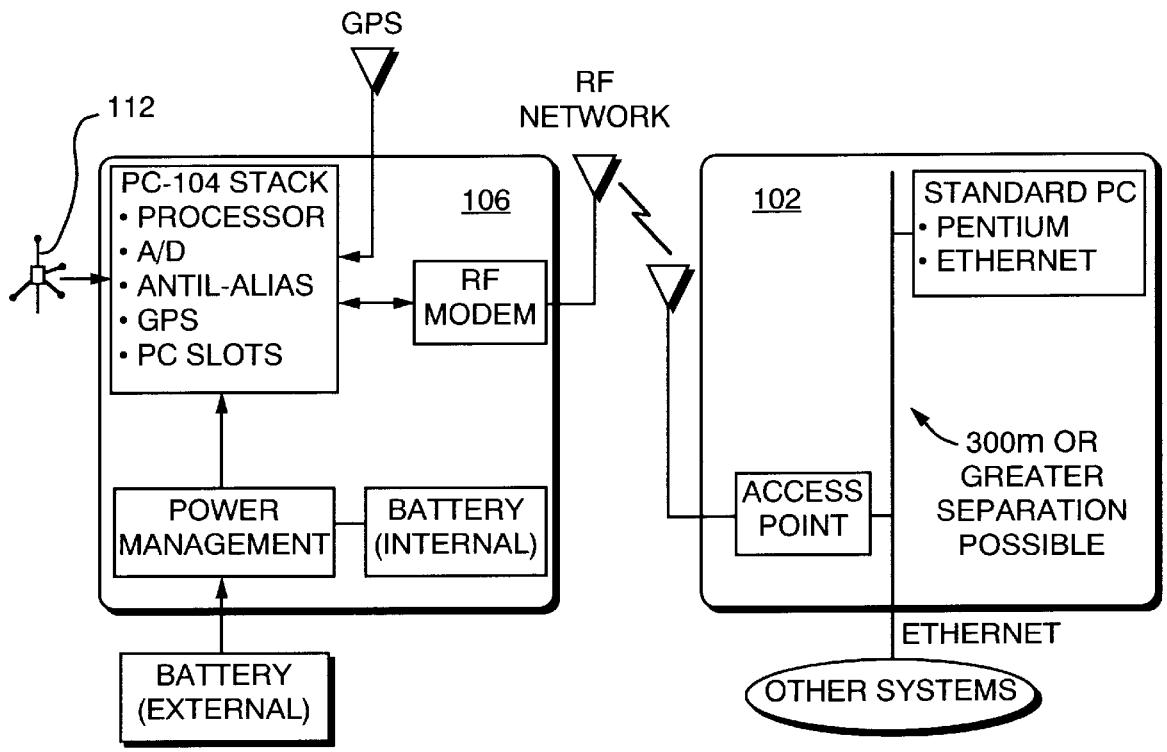
FIGS. 12a and 12b are block diagrams of the RF and Hardwired configurations, respectively, of the system hardware comprising the fixed acoustic counter sniper system according to the present invention.
Figure 12B:
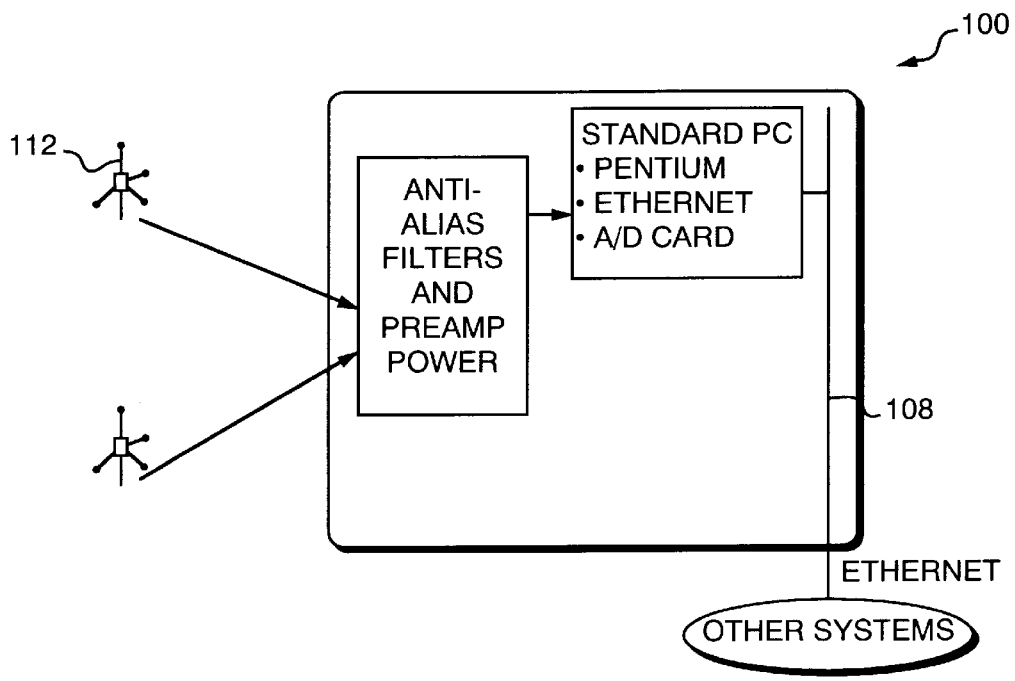

In a fourth illustrative embodiment as depicted in FIGS. 7, 12a and 12b, a fixed system 100 uses a PC-based command node 102 hosting the detailed detection, classification, and localization algorithms, as well as a graphical user interface 104. Acoustic data from the microphones or sensors 112 are digitized either directly by the command node 102 for a "hard-wired" system, or by environmentally protected PC based data nodes 106 communicating with the command node 102 over an RF network for the wireless version. Small size, battery power and GPS-based time synchronization of the data nodes 106 allows the sensors to be arbitrarily distributed and optimized for acoustic accuracy and coverage. While the system 100 will operate with as few as two directional acoustic nodes, barrier-type coverage and increased reliability and accuracy can be obtained with additional data nodes 106 and microphones 112. Both the localization algorithms and software, and the RF network communications architecture allow reconfiguration for more acoustic sensors 112, either omni or directional. The algorithms can be made to automatically adapt to handle the total available sensor field, as well as the particular set of microphones which have detectable signals on any given shot. Results are displayed in both numerical form and as an overlay on a digital map display 104.

The fixed system 100 is designed with reconfigurability, incremental development, and ease of use. The system 100 includes two versions, an "RF" (FIG. 12a) and a "hard-wired" (FIG. 12b). The RF system consists of data nodes 106 which acquire time synchronized waveform data on up to 4 channels at 20 kHz each after detecting a shock wave and a command node 102 which receives the digitized data from two data nodes 106 over a COTS (Commercial Off The Shelf) FCC Pt. 15 wireless network using the Proxim RangeLAN II, which operates at 2.4 GHz. The command node 102 archives and processes the data from both nodes and displays the trajectory, caliber, and sniper location results.

The RF data nodes 106 are implemented using a PC format, including a processor, an A/D converter board, GPS receiver, and PCMCIA interface to a flash disk and the RF network system. This system is housed in a 0.1 cubic foot box along with the anti-alias filters forming a programmable data acquisition unit which continuously digitizes all channels, looks for shock events, captures up to 1 second of data, time-tags it to better than 10 gsec accuracy and sends it over the RF network to the command node 102 at an effective rate of 0.1 to 1 MB/sec. depending on range and antenna type.

The RF data nodes 106 are shock mounted inside a 1 cubic foot weatherized and ruggedized shell which also houses a 12V Lead-acid gel battery capable of powering the RF data node 106 for approximately 17 hours. A power-management module allows external batteries to run and charge the system, and they may be replaced without disturbing system readiness. A weatherproof multi-pin connector on the exterior of the shell connects it to up to four microphones, distributed or arrayed. The RF network antenna is internal to the shell, but the GPS antenna cable exits through a weatherproof bulkhead so that it can be co-located with a sensor. The GPS antenna may be used for time synchronization and the Trimble Svee6 unit may be used with differential corrections adequate for sensor positioning use.

The wireless network hardware for this system may include three configurations. The first is a separate RF modem called an "Access Point" which connects to the command node 102 via standard ethernet cable and has the advantage of allowing the modem to be placed far away from the command node 102 (using up to 1 km ethernet run). This also allows the user to have both choice of antenna gains, e.g., omni, 8 dB and 12 dB gain directional antennas, dependent on the data node 106 distribution in the field. The use of ethernet also allows results to be transmitted to other command and control systems. A feature of the access point solution is that multiple units may be put on the ethernet and hand-off the data node communications in a cell-like fashion dependent on which has the best RF link. This allows a single command node to obtain data from a large field of potentially moving data nodes 106. The RF network modems are also available in standard ISA card format which fits inside a standard computer and the PCMCIA format used in the data nodes 106 which can be used with a laptop type PC. The ISA cards allow external high gain antennas to be used, but do not allow for a very remote location of the antenna due to high cable losses at 2.4 GHz. The laptop PC cards require no external power (battery operation) and offer a built-in omni antenna which is within a short distance the command node 102. The hardwired command node eliminates the RF modem and requires a PCI bus to support the 12 bit, 200 kHz aggregate A/D board used to implement the virtual data nodes 108 in software. An interface box with switched capacitor filters provides rolloff at 8 kHz with a sampling rate of 20 kHz.

With continued reference to FIG. 12b, the use of hard-wired "Virtual" data nodes 108 eliminates RF data and command nodes 102. Node modems and hardwired links from two tetrahedral arrays form a signal conditioning box which is directly fed to A/D converters in the command node computer. The "Virtual" data nodes software functions identically to the hardware data nodes 106 with the same output interface described above.

The command node software can be run on any capable PC compatible running Windows 3.1 or Windows 95, 98 or the like. Any type of computer preferably including at least a Pentium 160 MHz chip, PCI bus and color display may be used. A laptop type PC, useful in field tests, may also be used and has the advantage of making the entire system battery powered.

In the fixed systems 100, (due to the high pressure levels of the shock waves) high dynamic range sensors are used.

For example, peak pressures of a 50 caliber bullet requires the setting of maximum pressure capabilities at 145 dB re 20 $\mu$Pa in the 0–8 kHz band in order to avoid clipping. Programmable gain settings could set this as high as 163 dB if required. For outdoor, weatherproof operation, Bendix AQ-4 hydrophones with local 30 dB preamplifiers may be used for pressure transduction. The preamp power requirements are about 10 mW. Inter-array accuracies of 1% of the separation distance between the arrays gives approximately 1 degree trajectory estimate error. A cable of up to 0.5 km (typically 50 m) is connected to the data node 106 to carry the signal and power.

The preamplifier may be housed within a central weatherproof 0.05 cubic foot anodized aluminum hub and mounted to a tripod. The 1 meter arms of the tetrahedron arrays are mounted to the hub via rigid weatherproof connectors so the system may be easily broken down and shipped. The 1 meter arms are constructed of thin aluminum tubing which also serves as an electrostatic shield and have the hydrophones mounted at the ends in a consistent orientation so that element directivity effects would not differentially influence the signals. Additionally, the resonances of the arms are damped and located far from the vortex thereby shedding frequency for typical wind speeds. The resonances should be different for each arm to avoid mutual excitation of the entire structure. The systems are easily broken down and assembled without tools and are easily transportable. An integral level and site in the hub allows setup to the required accuracy without additional tools or instruments other than a tape measure. Intra-array tolerances on the element locations of approximately 1 inch are easily mechanically achievable and are verifiable with a tape measure in the field.

The fixed version of the acoustic counter-sniper system 100 uses software which emphasizes modularity, ease of insertion of new algorithms and data types and ease of access to intermediate processing results and data products. This software is written in C, C++, and Matlab and uses a Matlab GUI for operator input and text, graphical/image display and for all signal processing.

Figure 9:
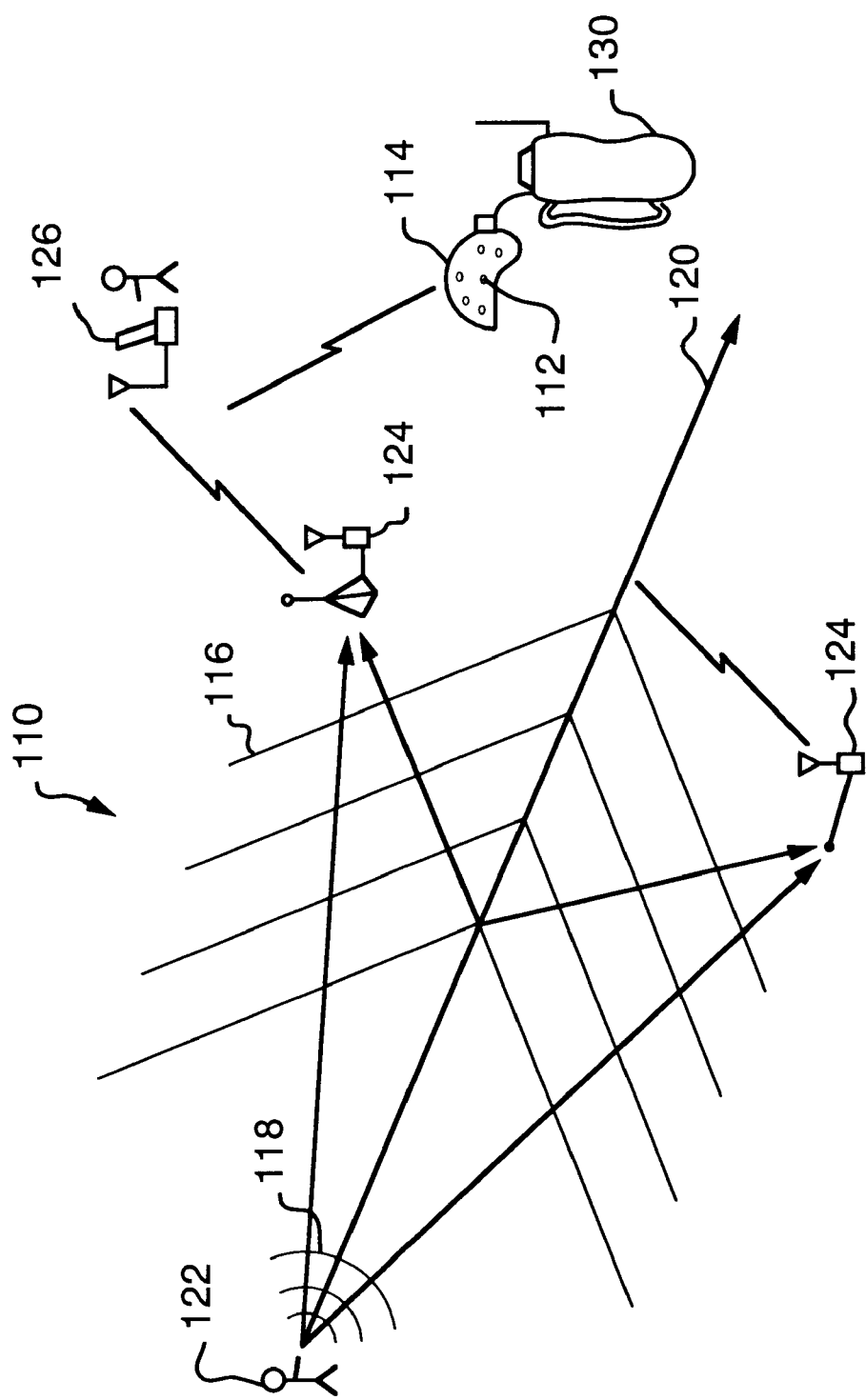
FIG. 9 is an illustration showing the concepts underlying the wearable acoustic counter sniper system according to the invention and depicting the acoustical disturbances generated by a supersonic projectile.

In a fifth illustrative embodiment and with reference to FIGS. 8*a*, 8*b* and 9, a versatile acoustics-based counter-sniper system providing a low cost and accurate sniper detection and localization is disclosed as a wearable or portable system 110. As discussed above, observations of the shock wave 116 from supersonic bullets or projectiles are used to estimate the bullet trajectory 120, Mach number and caliber of the projectile. If muzzle blast 118 observations are also available, for example from unsilenced weapons, the exact sniper location along the trajectory is also estimated. The very accurate model of the bullet ballistics and acoustic radiation is used which includes bullet deceleration, as described hereinbefore. This allows the use of very flexible acoustic sensor types and placements, since the system 110 can model the bullet's flight, and hence the acoustic observations, over a wide area very accurately. The system 110 has also been configured using microphone arrays flush mounted on standard helmets 114, and can provide coarse localization with only one helmet, or full performance if two or more helmets share data. Increased performance can be obtained by expanding the sensor field in size or density and the system software is easily reconfigured to accommodate this at deployment time and dynamically as assets are available. Communication of sensor nodes 124 for the wearable system 110 provides that each helmet 114 is supported by wireless communications, GPS, and a backpack or otherwise mounted computer system that computes and displays the solutions. The wearable system 110 uses the shock 116 and optionally the muzzle blast 118 to estimate the bullet trajectory 120 and sniper 122 location globally, using all available data integrated by an accurate ballistic and acoustic model.

The wearable acoustic counter-sniper system 110 includes distributed acoustic sensors or microphones 112 of various types including omni, tetrahedral array, and helmet mounted arrays. These sensors 112 may be in motion as long as supporting location and orientation data are provided. Wireless network communications are included among sensor nodes 124 and (optional) command nodes 126. The two may be combined at one site, such as in a wearable system 110. The wireless network passes partially processed acoustic data and logistics support data, as well as solutions for the trajectory 120 and sniper location.

The wearable system 110 allows an arbitrary number of arrays to be in motion, and to share data using a wireless RF network. Standard or flush-mounted microphones 112 installed on standard Army helmets 114 are each supported by a respective processing and display system. Each wearable system 110 includes detailed parametric models of the shock wave 116 and muzzle blast 118 space-time waveforms. Using this, observations of the shock wave 116 and/or muzzle blast 118 on two or more small microphone arrays, or six or more distributed omnidirectional microphones, are computed for the bullet trajectory 120, speed, and caliber. If the muzzle blast 118 is available, the shooter or sniper 122 coordinate location may be also estimated. Both amplitude and spectral characteristics as well as travel-time measurements are extracted from the acoustic data to globally estimate the unknown parameters using robust modeling techniques. A key feature of these systems 110 is the use of low-frequency data (<10 kHz). This allows both inexpensive and low power sensors and processing that extends the areas that each sensor can cover, since propagation loss is greater at high frequencies. The reconfigurable, wearable distributed multi-sensor system of the present invention 110 uses spatially distributed, wearable or fixed, omni or array acoustic sensors 112. These sensors 112 are particularly useful in some applications where few measurement points are available. The array sensors 112 provide degraded-mode performance with one array in the event of communications breakdown or GPS failure or blockage. The array sensors 112 are linked via wireless RF networking for sharing sensor location, orientation, and status information as well as raw data, partially processed data and/or estimated shooter locations. Hardwire links are also appropriate in some applications. The wearable system 110 provides distributed computation where each helmeted individual/system processes their/its own data together with that transmitted from other helmeted individuals/systems to develop a distributed solution.

The wearable system 110 provides high accuracy by obtaining window-sized localization at several hundred meters range to the shooter 122. As a result of the muzzle blast 118 and flash being easily countermeasured, observables from the actual flight of the supersonic bullet must be used. A characteristic and unavoidable signature of such bullets is the acoustic shock wave 128 emitted from all points along its trajectory 120, leading naturally to the choice of an acoustic sensing technique. If the bullet trajectory is estimated, it can then be followed back to the shooter. While observations of the shock wave 116 alone do not uniquely locate the shooter 122 along this trajectory 120, prior information on the muzzle speed of the bullet, or the intersection of the trajectory with known topographic or man-made features provide relatively unambiguous shooter locations. Additionally, if the acoustic muzzle blast signature is also observed, a very high quality estimate of the shooter location can be obtained using the time of arrival difference between the shock 116 and muzzle 118 waves.

The system 110 utilizes distributed sensors which provide high performance with practical sensor tolerances and costs. In particular, a system with microphones on either side of a trajectory greatly decreases the ambiguity between the Mach cone angle and the trajectory angles. A distributed sensor system naturally provides this type of geometry. This distributed system improves accuracy and reduces system tolerance requirements by not requiring wavefront curvature to be observed across a small aperture to resolve the ambiguity. However, because the Mach angle changes as the bullet slows, an accurate ballistics model including bullet deceleration is required to model and integrate the data over a distributed area for trajectory parameter estimation.

Figure 10:
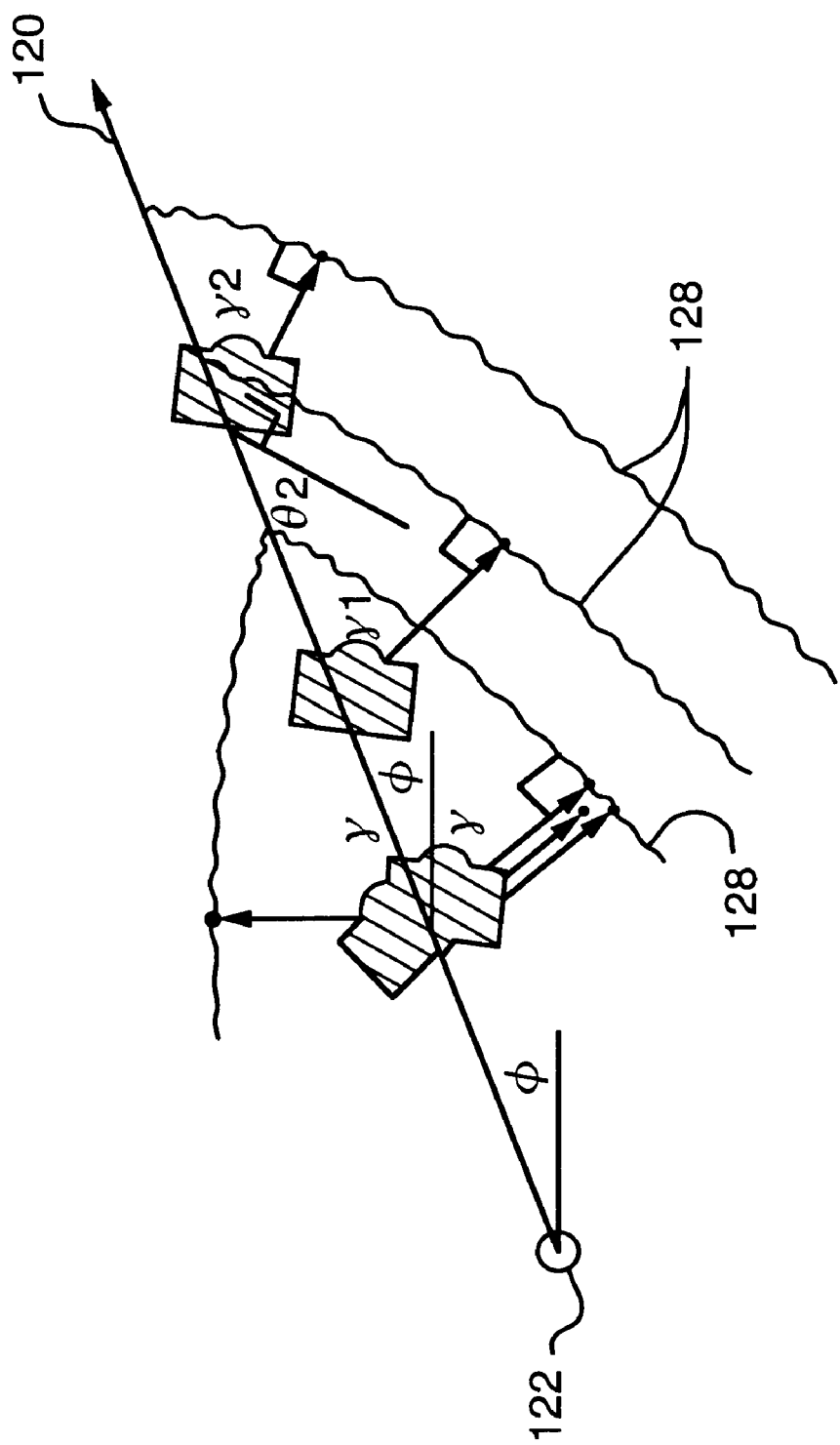
FIG. 10 is an illustration of ballistic trajectory and shock wave characteristics for distributed sensors.

Therefore, as is shown in FIGS. 9 and 10, the wearable system 110 utilizes the acoustic shock wave 128 as the primary observable. Since there is a need for an accurate trajectory ballistics and shock acoustical model applicable over the entire bullet trajectory 120, an inversion or estimation of the model parameters from the observed acoustic shock data is observed over a large spatial area. Also, when possible, the acoustic muzzle blast 118 is used to unambiguously estimate the shooter position along the trajectory 120.

The wearable counter-sniper system 110 is versatile and applicable to multiple scenarios, including: area protection for determining the direction of incoming fire on a compound; area monitoring for determining exact source of fire from a building; point protection for protecting of a stage or podium area; convoy or motorcade protection; small unit operations used for rapid determination of source of fire on a small moving group; and individual operation, for example, a single soldier or law enforcement officer or vehicle.

Figure 11B:
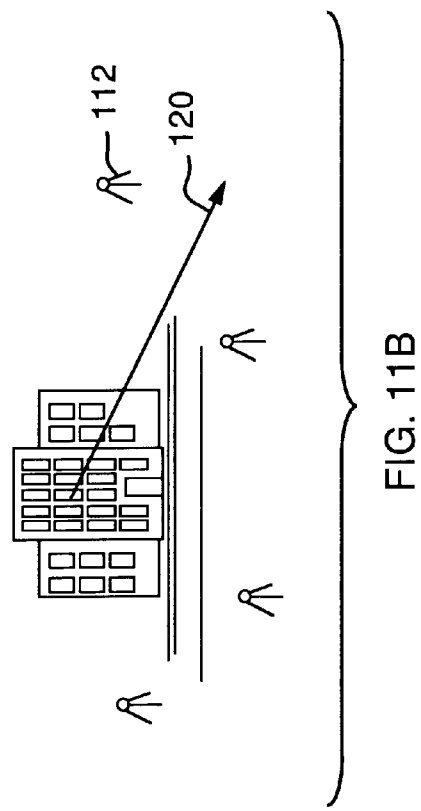
FIGS. 11a and 11b are an illustration depicting deployment scenarios for the fixed wearable acoustic counter sniper system according to the present invention.
Figure 11A:
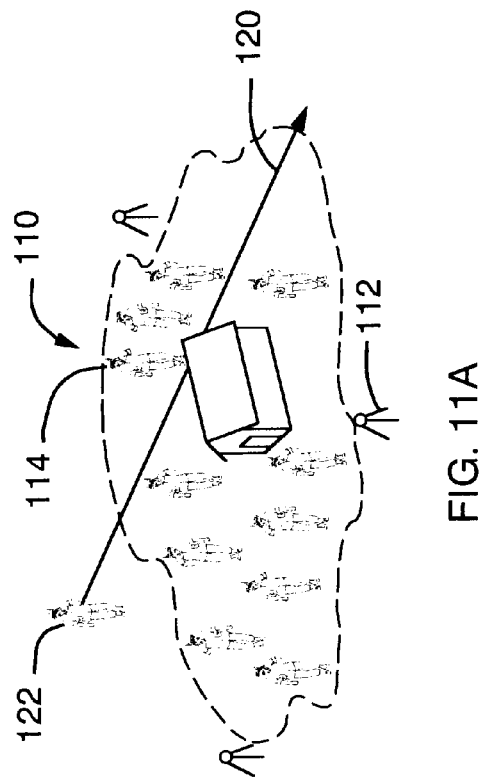

With reference to FIGS. 11a and 11b, the wearable system 110 and the fixed sensors 112 can be configured to provide area protection and monitoring with sensors fixed and distributed in or around the area to be protected or monitored. In this type of deployment, either single microphone (omnidirectional) sensors 112 or small arrays may be used. Single microphones are more easily concealed, but require occupation of more points, with increased infrastructural demands for either local power for RF links or for communications and power cables. Alternatively, a lower density of small arrays may be used if their size and visibility are not a limitation. With the wearable system technology 110, sensors may be located on a solid curved surface, such as a helmet 114 as well as street lamps and other common objects. For point protection, two arrays flanking the protected area are ideal. These arrays may be permanent or temporary, and their locations can be determined by a survey at time of installation.

For protection of moving convoys, sensors 112 can be mounted on two or more moving vehicles which requires that wind noise abatement be applied to the sensors. The high acoustic level and broadband characteristics of the shock wave 116 make wind and engine noise a minimal problem. Reasonably accurate relative location information (such as that available from real-time differential GPS) is adequate for sensor 112 location determination. Array sensor orientation using commercially available magnetometers and level sensors is problematic on vehicles because of their high accelerations on rough roads, but omni directional sensors on a large number of vehicles avoids this problem. Alternatively, a more costly strapdown gyro can be used. It is also possible to use larger surface-mounted arrays for single-vehicle solutions in the vehicle coordinate frame, although noise problems increase and vehicle shadowing of the acoustic waves is potentially problematic.

The small unit and individual soldier operations use the wearable acoustic sniper system 110 because of the ruggedness, the potential for low cost and low volume and power requirements of the acoustic solution. If six or more soldiers operate in close proximity (e.g. within a 200 m radius), individual omni microphones on their helmets 114 with data shared among them by RF communications and localized by differential GPS (or equivalent) provides a system 116 with adequate performance. Helmet omni sensors are also attractive in that they do not require orientation sensors to determine the array's attitude. Alternatively, the helmet 114 can be used as a platform for a flush mounted multi-microphone array. This is adequate for both accurate distributed localization using shared data from two or more such helmets 114 (supported by GPS and head orientation sensors) and for a single-helmet 114 solution using shock 116 and muzzle 118 observations. This single-helmet 114 solution is still adequate for indicating a small angular sector and range to the shooter and provides a backup single-soldier capability if communications are lost.

Figure 13:
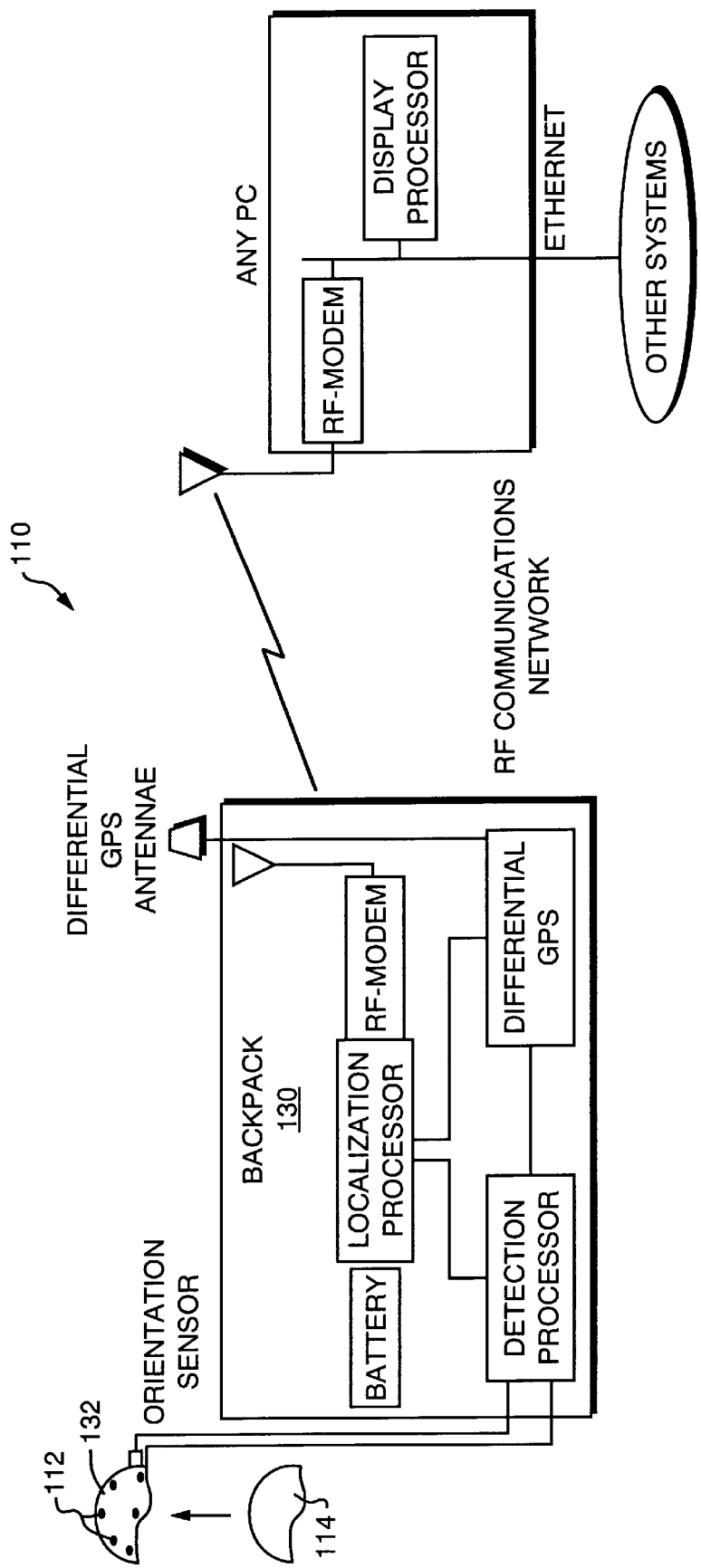
FIG. 13 is a block diagram of the system hardware comprising the wearable fixed acoustic counter sniper system according to the present invention.

As is shown at FIGS. 8 and 13, the wearable counter-sniper system 110 uses a helmet-mounted sensor suite 112 and a backpack mounted processing system 130. Operation includes both data-sharing among the wearable systems which detects the signal from the bullet to achieve an accurate "multi-node" solution and a "single-helmet" solution for bullet trajectory 120 and sniper location. This latter solution generally requires the muzzle 118, as well as the shock 116 wave, but provides a backup in the event of communications loss. The key elements of the embodiments of the wearable acoustic counter-sniper system 110 includes twelve microphones 112 flush mounted on the helmet 114, a helmet orientation sensor, a GPS for system location, and a processor and display system.

Although the shock wave 116 of a supersonic bullet has a wide bandwidth near its point of origin along its trajectory, it gradually loses high frequency content due to acoustic propagation losses. Acoustic counter-sniper systems using solitary compact arrays must effectively use this high-frequency information to obtain the precision inter-sensor time delays needed to resolve wavefront curvature over a small aperture for simultaneous estimation of trajectory and bullet speed if only the shock wave is used. Not only does this potentially reduce the effective area of coverage per microphone of the systems, but this high precision also requires extremely accurately placed and calibrated microphones, and broadband data acquisition channels. the high data rates from these channels require powerful processing. All these requirements increase the cost of the system.

For a spatially distributed system, the timing and sensor localization requirements for each microphone is dramatically reduced because of the long acoustic baselines and the numerical conditioning of the inversion problem using observations on each side of a trajectory. Relative travel times adequate for reasonably accurate estimation of the "plane-wave" direction of propagation are required. Thus, the bandwidth, calibration, and signal to noise ratio requirements of each microphone are much reduced and the area covered by each microphone is increased. This leads to fewer and less expensive sensors, electronics, and lower data rate signal processing. Low bandwidth also has the advantage of reduced power consumption at all levels. Adequate muzzle wave 118 and shock wave 116 arrival time estimates are obtainable with less than 8 kHz bandwidth (using 20 kHz sampling). This bandwidth is also adequate to support accurate bullet caliber classification using the details of the shock's N-wave. This classification is used for estimation of the bullet ballistic coefficient, which is used in the detailed trajectory modeling supporting the distributed sensor concept. Finally, the use of low-frequency microphones for the shock wave 116 also allows them to be used for the muzzle blast 118 and in distributed mortar and artillery location systems as well, thereby maintaining hardware simplicity while adding additional capabilities.

In addition to the cost, power and area coverage/microphone advantage of a distributed system, it is also fundamentally more robust than solitary array solutions. Additional sensors may be added to improve performance or coverage seamlessly, and some can fail without degrading the solutions significantly. Since inter-sensor data rates are small, and the signal processing burden is light, computation may easily be distributed to multiple sites, even to the individual soldier level, further enhancing the system's robustness.

The wearable system 110 according to the present invention is waterproof, operates within low-bandwidths, includes the option of using inexpensive and simple sensors with integrated low-power electronics, processing, mechanically undemanding arrays, low-precision sensor orientations and locations which can be derived from COTS subsystems. In addition, the sensor distributions are redundant, i.e., provide more than the minimum 6 shock arrival times, so that some can fail without adversely affecting the solution. Also, the use of processing algorithms which easily accommodate more or less data on a shot by shot basis and which automatically detect and eliminate poor quality or inconsistent data from false detections or sensor location and array orientation errors are used.

The wearable system 110 is designed to be body-worn, integrate real-time array location and orientation sensors, include robust algorithms for fusion of data from multiple wearable systems, include a secondary "degraded" operational mode using only the data from one wearable system which provides capability in the event of poor acoustical or communications conditions.

With reference to FIG. 13, the embodiment of the wearable system 110 includes a helmet mounted, 12-microphone array 112 supported by an electronic compass, an electrolyte level orientation sensor, a processing system, and a GPS mounted in a backpack 130. The processing system comprises a dedicated DSP (digital signal processor) for data acquisition and detection processing and a general purpose CPU (central processing unit) for localization processing and display. Location of the system is supported by a differential GPS. Communications between all systems and a remote display node use similar hardware as described herein before.

Factors that favor placing microphones 112 on the helmet 114 include: that the helmet 114 is the most likely region of the body to be exposed to the sound from the shock wave 116 and muzzle 118 blast; it is reasonably sized; and is a geometrically stable aperture for supporting the sensors. Also, the helmet's rigid structure and location away from most magnetic materials makes the helmet 114 ideal for measuring and orientating using three-axis magnetometers. The protective structural integrity of the helmet 114 is important. Although microphones could be integrated with the helmet itself, in this embodiment a lightweight but durable PVC plastic overlay 132 is used to hold the microphones and some electronics. The overlay is sized to fit over all standard issue helmets 114. In standard uses, 12 small waterproof microphone elements 112 are attached to a flexible circuit board, along with the signal conditioning electronics (anti-alias filters and cable drivers) which are glued conformably to the inner surface of the PVC overlay 132, exposing the active microphone faces through holes in the PVC overlay 132. The microphones 112 are waterproof and are desensitized allowing linear transduction at up to 160 dB re 20 $\mu$Pa. Along a back portion of the PVC overlay 132, a small bulge of approximately 2 cm clearance to the helmet 114 is included and contains adequate room to house a customized three-axis magnetometer and level sensor for helmet orientation. A non-customized version of this level sensor level may be mounted to a small waterproof box external to the bulge. A rugged multi-conductor cable carries the analog microphone signals and the RS-232 signals from the orientation sensor to the processing system in the backpack 130. The helmet overlay 132 and all sensors 112 and electronics weigh approximately 7 ounces with weight reduction being possible by using thinner materials and housing the orientation sensors in the overlay itself.

Acoustic localization using the small aperture afforded by the size of a helmet 114 requires approximately 15 $\mu$sec relative travel time error between the microphone elements 112. To achieve this, 12 microphones are spread over the entire surface of the helmet overlay 132 which approximates a hemispherical shape. Any shock 116 or muzzle 118 waves arriving at the helmet 114 are received by at least four and generally six microphones 112 which are adequately undistorted by the helmet's structural acoustics to allow relative travel time to be determined to this level of accuracy by broadband cross-correlation processing. In general, the muzzle waves 118 provide fewer good channels than do the shock waves 116 due to its lower frequency content. At low frequencies, a significant distortion to the waveforms received on acoustic sensors 112 not facing the incoming wave is induced by bulk helmet acceleration. The signal processing algorithms use several rules to determine which sensors provide the highest accuracy data and determine the acoustic wave arrival times and azimuth with the best subset. The three-axis magnetometer and level sensors provide approximately 1° to 2° of accuracy when calibrated with energized helmet electronics and the backpack in a shouldered position. In an operational setting, azimuth errors are expected to be dominated by knowledge of the local magnetic variation and by helmet acceleration. Electrolyte type gravity level sensors may have some errors when they are moved too quickly due to viscosity lag and sloshing and due to the acceleration bias itself. If such sensors prove to be a problem, they can be augmented with gyros which directly measure helmet rotational accelerations.

Figure 14:
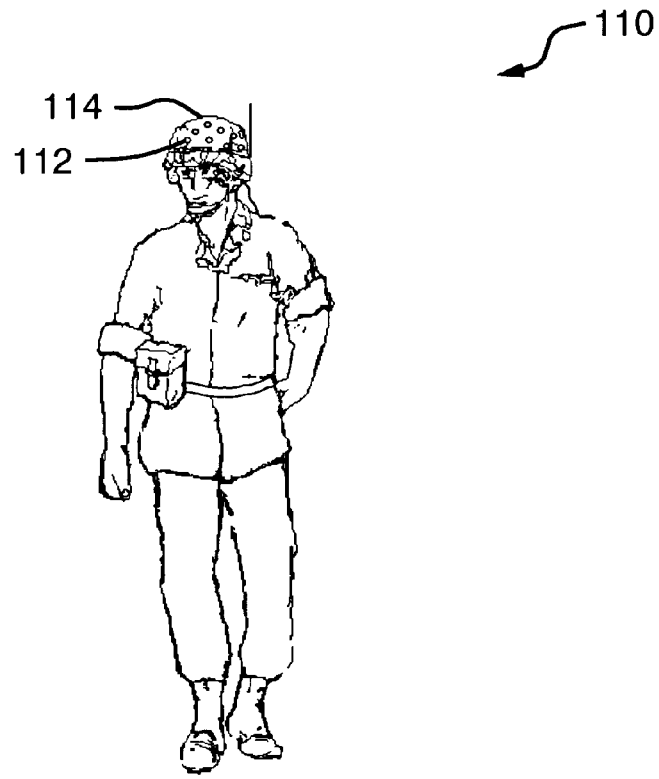
FIG. 14 is an illustration of an operational hardware configuration of the wearable counter sniper system.

The main counter-sniper specific sensors and processors may be combined with state-of-the-art orientation, GPS or other location technology, warfighter oriented display, wearable computation, and battlefield communications subsystems. As shown in FIG. 14, both hardware and software interfaces at each of the points in the system likely to be used in operation are designed to be ergonomical, economical, to consume low power, and to be interchangeable with other soldier worn systems. The acoustic sensors 112, which may be shared with other acoustic detection/localization tasks, are mounted on the helmet 114. The detection and initial data reduction processor is also located on the helmet 114 to convert the large bandwidth and continuous sensor data to a small number of discrete detections and parameters. This processor is looking for shots in the 500 Kbytes/sec data stream. The counter-sniper system 110 needs only 1 kbyte of data from each helmet 114 for each detected shot, reduced from 500 kbytes of raw acoustical data for a typical 1 second shot snippet containing shock 116 and muzzle 118 wave arrivals. The data includes sensor orientation, GPS location, amplitude and absolute and relative arrival times on each microphone 112 for the shock 116 and muzzle 118 waves. This vastly reduces the bandwidth of communications off the helmet 114, and allows a micropower RF link to be used. The data, now reduced, is sent to the body-worn computer shared by multiple tasks with other systems. This sharing of multiple tasks only needs computational resources when a shot is detected wherein each individual helmet 114 data is combined with that from other helmets 114 coming in over the RF network to form the sniper location and bullet trajectory 120 and classification solution. The body worn computer also forwards each individual helmet data to other wearable 110 as well as fixed 100 systems for their use, and drives the display to communicate the solution to the user.

With particular reference to FIGS. 13 and 14, the hardware place holder for the helmet-mounted detection processor may be an Innovative Integration SBC-31, TMS320C31 based single board computer with 16-channel A/D capability at 18,500 Hz/channel on a small 3U Euro card which consumes less than 3 Watts at +5 and +12 volts. The detection processor computer includes a serial port for communicating with the orientation sensor and another serial port for communicating with the localization processor.

The implementation of the shared body worn computer hosting the localization processor and long-range RF communications may be a moderate to high-end laptop-type PC with two serial ports and a RF network PCMCIA card. One serial port communicates with the detection processor while the other communicates with the differential GPS. The GPS may be a Trimble DSM-Pro unit with integrated real-time differential capabilities using U.S. Coast Guard differential correction broadcasts. Power can be provided by one or two flat-panel Zinc-Air batteries, or by external lead-acid batteries. Alternatively, a remote display, e.g., the helmet-mounted Private Eye, can be easily integrated using the VGA port on the laptop PC.

The wearable acoustic counter-sniper system 110 may use computational algorithms written in C or C++. This networked distributed system and shared (RF) physical network layer allows the wearable nodes to broadcast their data to all other nodes after a detection is made in order to avoid multiple point-to-point links. To account for acoustic delays, network latency and multiple broadcasts for reliability, each node may wait for a short period after its own detection before attempting to compute the data received and compute the "multi-nodal" (multi-helmet) solution. In this waiting period, each node uses its own-helmet data to compute its "single node" solution to provide an initial shooter location estimate. The solutions are made available in a short computation time which may be improved through algorithm coding improvements, waiting period tuning, and hardware upgrades. In particular, use of a real-time operating system can provide substantial improvement in computation time.

Figure 15A:
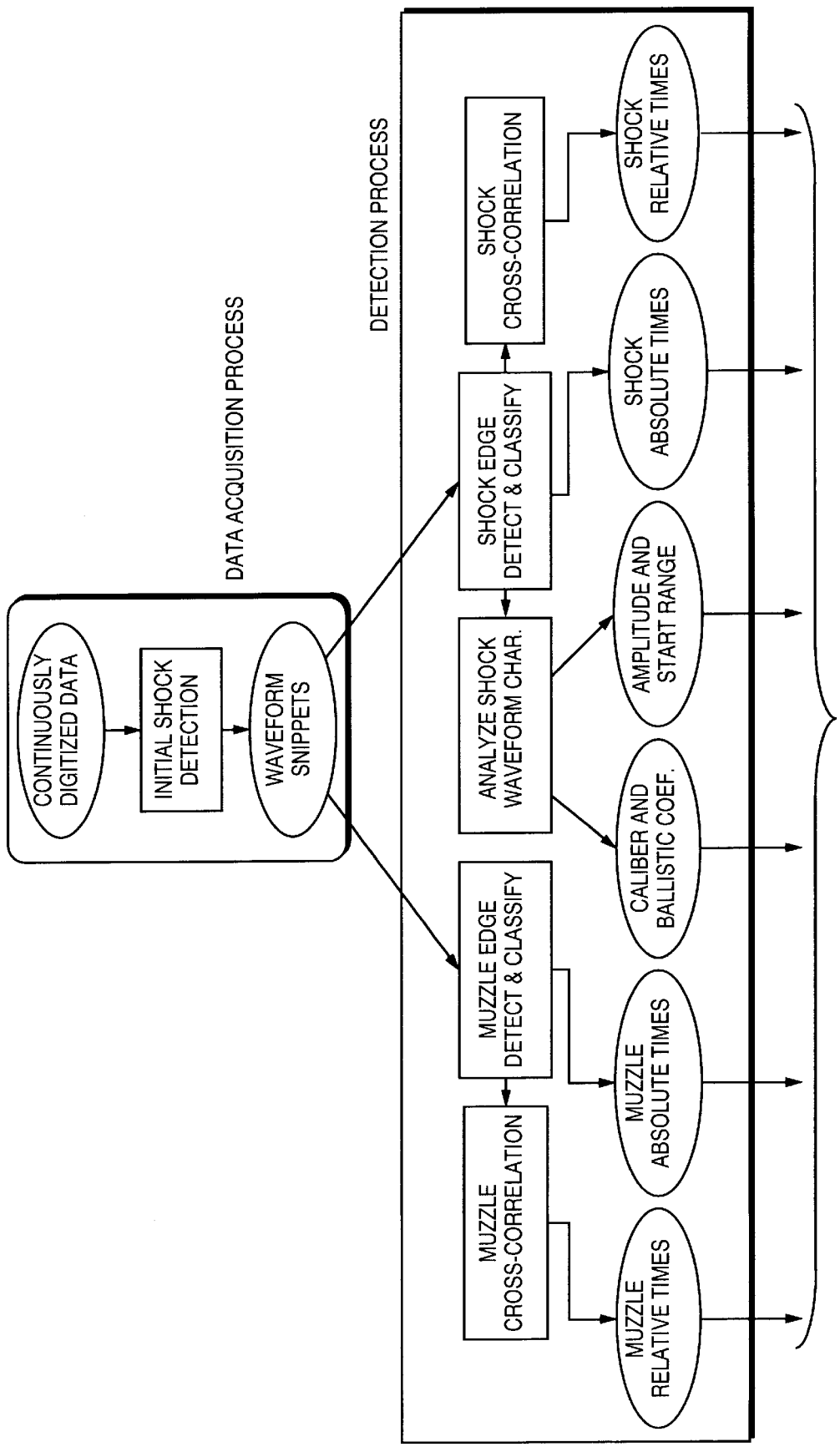
FIG. 15 is a block diagram of the system processing of the wearable counter sniper system.
Figure 15B:
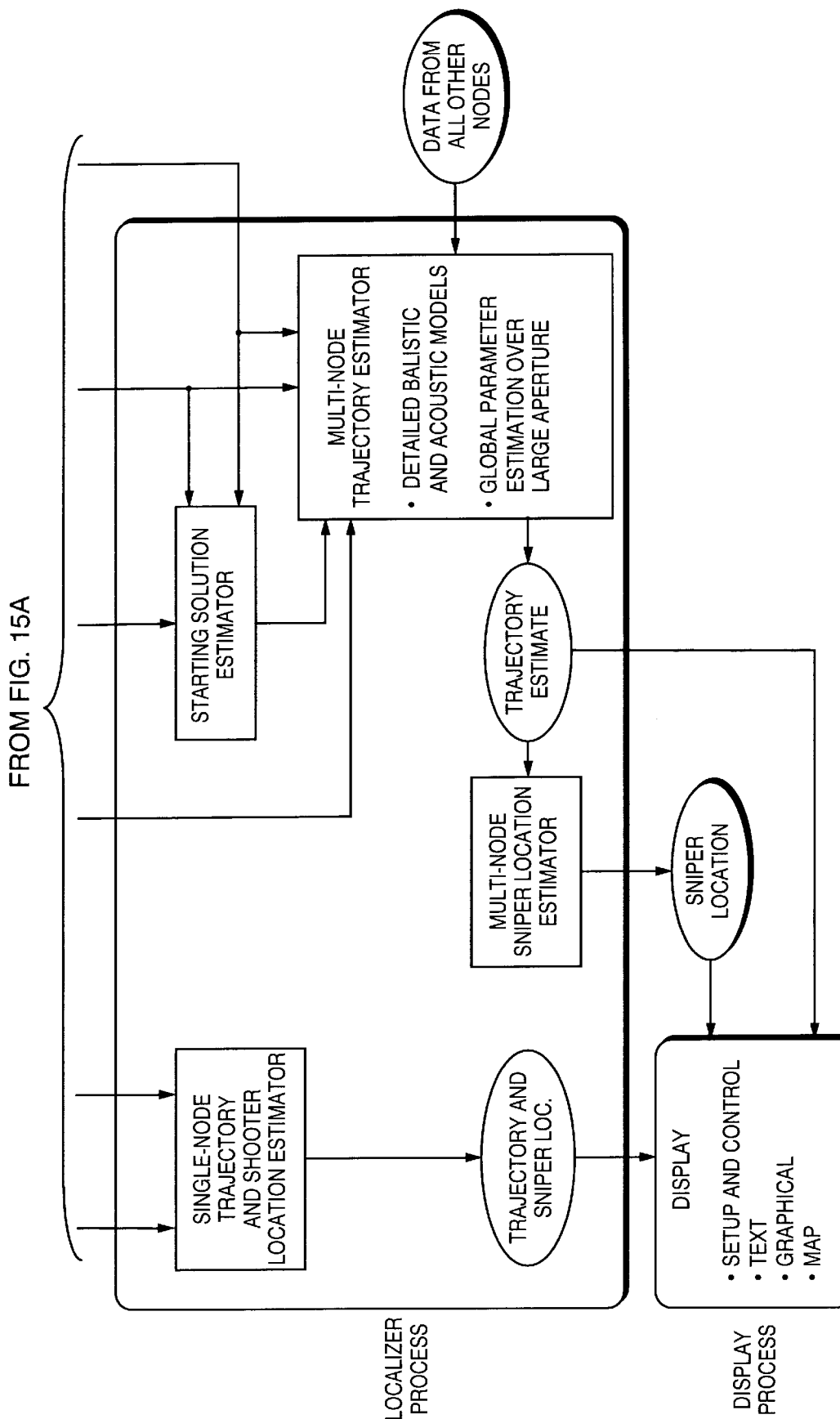

A block diagram for the major processing steps is shown at FIG. 15. Acoustic data is continuously digitized by the data acquisition processor and one or two channels for each array is scanned for a shock wave arrival using either a fixed pressure threshold, or a CFAR (constant false alarm rate) background noise normalizer and threshold detector in the initial shock detection module. In practice, both methods have functioned equally well because of the high SNR (signal to noise ratio) of the shock wave 116, though the normalizer is more robust in noisy situations. When an initial shock detection is made, a waveform snippet from the A/D ring buffers of specified length and pretrigger duration (to account for array aperture) is saved and passed on to the detection processor.

The detection processor includes software which first detects the shock wave 116 leading edge on all channels in the shock edge detect and classify module. It does this by high-pass filtering the data above 700 Hz and running another CFAR detector. These absolute arrival times are stored and a smaller shock waveform consisting of just the N-wave is passed to the shock wave cross-correlator for precise relative time of arrival estimation. This is done for inter-element processing on array sensors, e.g., tetrahedra and helmets, in which the added accuracy of the cross-correlator is required because of the small inter-microphone baselines and the N-waves on all microphones are similar because their slant ranges are nearly identical. These relative arrival times are also stored. The detection processor software treats the muzzle blast 118 similarly to the shock wave 116.

Also analyzed by the systems herein are waveform characteristics by modules which estimate slant range from the N-wave by two different methods, each of which depend on bullet caliber. The caliber for the closest slant range pair is used as the caliber estimate and the corresponding slant range is used as the slant range estimate. The caliber is the primary correlate of bullet ballistic coefficient, which is used to determine the deceleration of the bullet for accurate global modeling of the trajectory.

In the localization processor, the starting solution estimate module is fed by the shock relative arrival times and the slant range to form an initial coarse estimate of the trajectory using simple trigonometry and/or a coarse grid search of the solution space for the best fit for a non-decelerating bullet. A simplified ballistics model for a constant speed bullet is used to speed up the calculations. This starting solution estimate is passed on to the multi-node trajectory estimator module.

Figure 16:
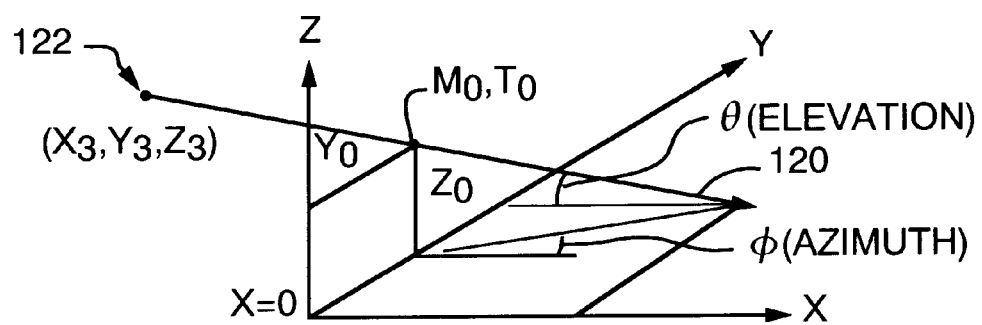
FIG. 16 is an illustration of trajectory and sniper location parameters of the wearable counter sniper system.

The multi-node trajectory estimator module uses the ballistic coefficient and detailed decelerating projectile ballistic model and acoustic time of arrival (TOA) model in a non-linear optimization to estimate the five parameters of the bullet trajectory ($\theta$, $\phi$, $Y_0$, $Z_0$, $M_0$) from the observed absolute and relative times of arrival, substantially as discussed hereinbefore. These parameters are shown in FIG. 16, along with absolute time, $t_0$, and the sniper location 122, ($x_s$, $y_s$, $z_s$). The non-linear optimization uses the iteratively-reweighted nonlinear least squares algorithm to globally estimate the trajectory over all the available data after initialization with the starting solution estimate. This procedure optimizes the least absolute value (L1error criterion rather than the least squares (L2) error. This error criterion is extremely robust to the presence of poor quality data with large potential error values mixed in with good data. Most practical data acquisition scenarios from multiple sensor sites contain these L1 and L2 types of errors due to global detection errors and sensor mislocations and misorientations. The final output product of this module is the entire bullet trajectory, in the form of the five-member trajectory perimeter estimate ($\theta$, $\phi$, $Y_0$, $Z_0$, $M_0$), shown in FIG. 16. The angles $\theta$ and $\phi$ are the trajectory angles, $Y_0$ and $Z_0$ are the intersecting point with an arbitrary plane defined at $x_0$ in the coordinate system used and $M_0$ is the Mach number (speed) of the bullet at that plane. Note that the multi-node trajectory estimate does not use the muzzle data, which is much more likely to be weak, contaminated by noise and reverberation, and diffracted by buildings and topography because of its lower frequency and greater range from array node to shooter than array node to bullet trajectory.

As previously discussed, the trajectory estimate from the shock wave 116 alone can provide a reasonable prediction of the shooter location if digital maps are available to trace the trajectory back to obstructions or likely shooter locations. Since a decelerating bullet model is used, the trajectory 120 can also be traced back to the point where the bullet speed is the known muzzle velocity of likely weapons being used. However, in some circumstances the muzzle blast wave 118 may be available, in which case the values will be exploited to provide a better estimate of the shooter location in a manner which does not depend on prior information.

The muzzle edge detection and classification module filters the waveform snippet to a band from approximately 100 to 500 Hz optimized for the muzzle blast 118 from various weapons. A CFAR detector with parameters optimized for the muzzle blast 118 characteristics looks for the leading edge of the blast on each microphone channel. Because these detections are made in the presence of reverberation and scattering of the shock wave 116 from nearby buildings and topography, many false detections may be made. For this reason, a classifier is run which compares the energy above 700 Hz to that below 500 Hz for each of the detections. If this ratio exceeds a certain value (obtained from many data sets), it is called a false detection, and is eliminated. If any detections on any channel are not eliminated in this manner they are output as muzzle absolute arrival time data. These data, the shock absolute arrival times, and the trajectory parameter estimate are combined in the multi-node localizer module which estimates the sniper location on the trajectory 120. This is a single parameter estimator which uses the same L1 procedure as the trajectory estimator to obtain a robust estimate of the exact shooter location. This estimator will again weed out globally wrong data, and uses the predominance of the evidence to obtain what is effectively the range estimate to the shooter 122 along the trajectory 120.

In use of a single helmet array solution, the difference in arrival times between the shock 116 and muzzle 118 waves at the helmet 114 and the dot product between the shock and muzzle arrival wave vectors (or correspondingly the cosine of the angle between the two arrivals) can be used, along with the sound speed to determine the range to the shooter from the helmet through the relation:

$$r = c(t_m - t_s)/(1 - \cos \phi_{m-s}) = c(t_m - t_s)/(1 - v_m \cdot v_s)$$

This range, along with the muzzle arrival wave vector, gives the unique 3-D location of the shooter relative to the helmet 114 with further manipulation being used to obtain the trajectory vector.

These simple relations yield a very rapid solution which is, however, not as robust or accurate as the multi-node solution for the following reasons. First, it generally requires a reasonably strong direct path to the muzzle. Second, the underlying model does not include bullet deceleration, and is therefore approximate. Third, the small baseline of a single helmet 114 does not allow the angular accuracy afforded by the large baseline of the distributed array of the multi-node/helmet solution. This impacts both the direction to the shooter, and the range estimate, since the angles appear in the range formula above. Nevertheless, because the single helmet solution is rapid, and because it is independent of other helmets 114, it provides a significant enhancement to the overall system operability (fast results) and reliability (results even if communications are disrupted).

Figure 17:
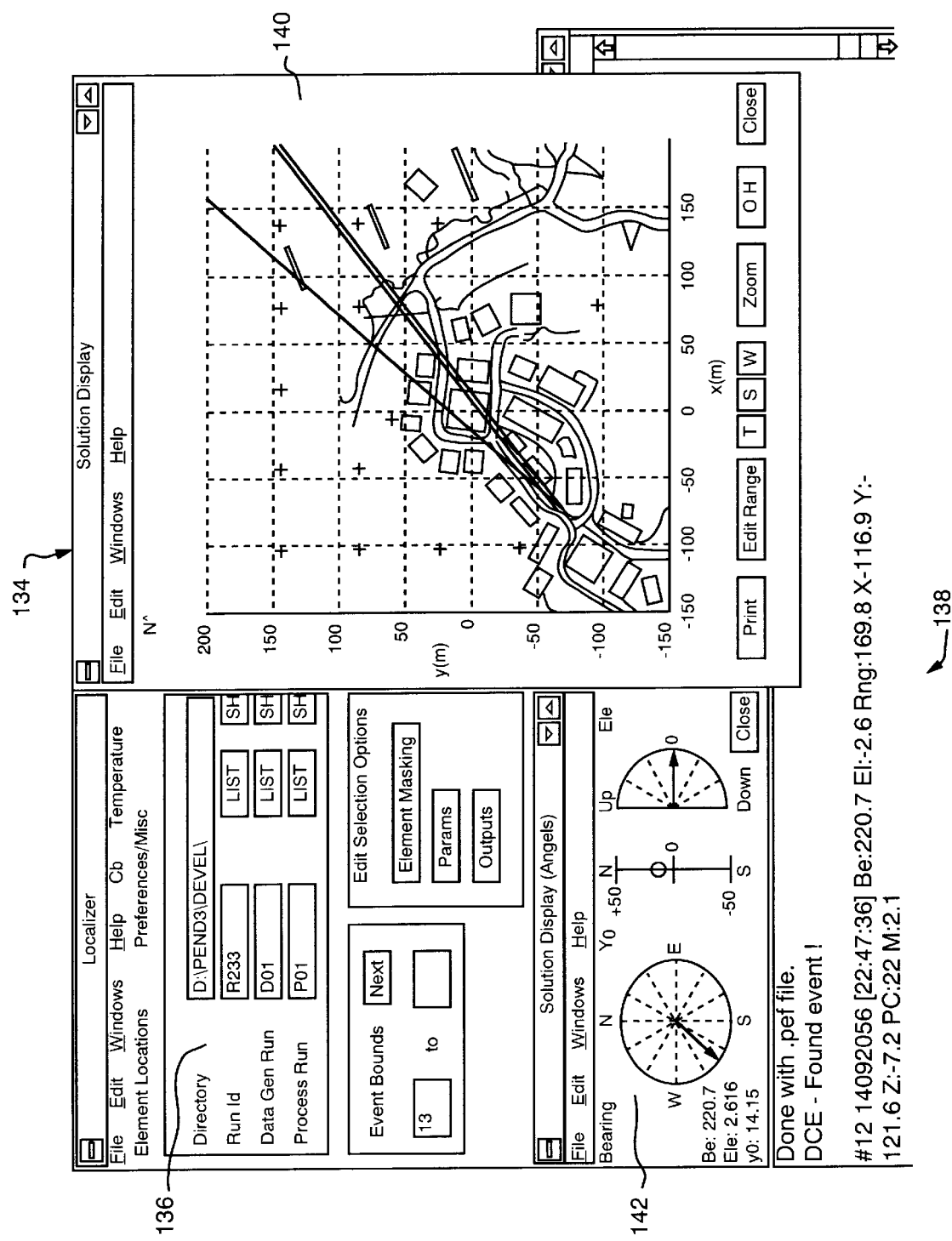
FIG. 17 is an illustration of the user interface for both the fixed and wearable counter sniper systems according to the present invention.

Referring now to FIGS. 15 and 17, the display module provides both text and graphical output displays of intermediate data products including raw snippet data, bullet trajectories and shooter locations overlaid and justified to digital maps and grid coordinates. The display module also provides different perspectives to view elevations as well as plan views. A helpful feature in the GUI (Graphic User Interface) used for configuring the system 110 and setting system parameters is an intelligent "guide" that highlights the next logical dialog box, button, or entry to be modified or verified. This guide walks the user through system setup and vastly decreases operator errors. Another useful feature is a RF link status panel which alerts the operator to malfunctioning communication links. This link is tested every 30 seconds by exercising the network. Because the raw data is all archived, it may be reprocessed by the system in a playback mode to test algorithm and parameter changes.

As shown in FIG. 17, a system display 134 from the fixed and wearable counter-sniper system 100 and 110 embodiments is shown with a setup window 136 for the localizer in the upper left corner. This window is used to set up and change processing parameters and archive locations. Once the system embodiments 100 and 110 are in operation, this screen is not used and may be hidden or eliminated. An instantaneous solution display 142 displays a compass with bearing to shooter indicated, a N-S bar showing how many meters away from the reference point ((0, 0, 0) in this case) the bullet passed and an up/down indicator showing the elevation of the shooter on the bearing line. The instantaneous solution display may also show a numerical readout of the bearing, elevation, and miss distance of a projectile or bullet.

Along, the bottom of the screen is a simple text readout 138 showing the time of shot, bearing, elevation, range to shooter, grid coordinates (X, Y, Z) of shooter, caliber of bullet (labeled "PC"), and Mach number (M) of the bullet as it passes through the X=0 reference grid plane. Finally, the most intuitive display is on the right, a map plan view screen 140, with topographical/urban features as a background and the bullet trajectory (lines) overlaid on it. The map plan view screen 140 includes "X" annotations showing the location of the estimated shooter location on the trajectory. In this case, a history of trajectories from two shooter locations is shown, that is, the shot to shot scatter. The control buttons on the bottom of the map screen 140 allow change of the views from (X, Y) "top" (T) view to a "side" (S) view in (X, Z) coordinates, or "wall" (W) view in (Y, Z) coordinates. The "wall" nomenclature comes from viewing the estimator's natural $(Y_0, Z_0)$ coordinates reference plane intercept discussed earlier. All views may be zoomed in or out, and the default display range can be set. The "Hold" button (H) keeps the screen from refreshing on each shot so that a history of shots can be viewed. Although a simple local grid in N-E meters is shown here, for operational use the setup screen allows the display to use military grid coordinates. The use of separate windows for each type of display allows a wearable display device with limited resolution and screen area to choose the window of interest and display it full screen.

Although the illustrative embodiments described herein comprise fixed sensors, mobile vehicle (or aircraft) mounted sensors and sensors mounted on individuals, respectively, one skilled in the art should appreciate that these different sensor types may be used in conjunction with each other in a single system.

While the illustrative embodiment described herein includes an RF packet radio to communicate data between the sensor node and the command node, one skilled in the art would appreciate that other wireless or wired forms of data communication may be used.

While at least one of the illustrative embodiments described herein includes aspects that are implemented in code utilized by the system, one skilled in the art would appreciate that the invention can be implemented in various combinations of hardware and/or software.

While at least one of the illustrative embodiments described herein includes a PC to process information from the sensor nodes, one skilled in the art would appreciate that processing means can be alternatively implemented, such as in embedded DSPs or a general purpose microcomputers or application specific integrated circuits. Further, the functionality described herein can be implemented as various combinations of hardware and/or software.

While illustrative embodiments described herein include a 8 kHz low pass filter, a 700 Hz high pass filter, a 500 Hz low pass filter and a 100 Hz high pass filter, one skilled in the art would appreciate that other filters may be used as a function of the application or type of ammunition to be detected.

Although the illustrative embodiment herein includes a ballistics model for 22, 30 and 50 caliber bullets, one skilled in the art would appreciate that other caliber bullets may be modeled in the same manner.

Although the invention has been shown and described with respect to exemplary embodiments thereof, various other changes, omissions and additions in the form and detail thereof may be made therein without departing from the spirit and scope of the invention.

What is claimed is:

1. A system for determining the trajectory of a supersonic projectile comprising:
   at least two spaced apart sensor nodes each in a known location encountering pressure waves generated by said supersonic projectile passing proximate to said sensor nodes, said sensor nodes each comprising a transducer collecting pressure wave information and generating pressure wave information signals in response to said pressure waves, the pressure wave information signals having a time series information signal;
   a main processor processing said time series information signal to provide parameter information for determining said trajectory of said supersonic projectile; said processor comprising,
   a shock threshold detector receiving said time series information and recording arrival times of shock wave components of said pressure waves at each transducer for each of said at least two spaced apart sensor nodes,
   a cross correlation processor receiving said arrival times of shock wave components of said pressure waves at each transducer and determining relative shock wave arrival times,
   a blast threshold detector receiving said time series information and recording arrival times and amplitude information of potential blast wave components of said pressure waves at each transducer for each of said at least two spaced apart sensor nodes;
   a discrimination processor discriminating said potential blast wave components to classify each of said potential blast wave components as blast wave, shock wave, or neither, and storing arrival times of each of said potential blast wave components classified as blast wave, a ballistic coefficient processor estimating a ballistic coefficient of said supersonic projectile as a function of peak voltage (Vp) and N-wave slope (V/T) of said time series information, and
   a trajectory estimation processor calculating an estimated trajectory of said projectile based on said ballistic coefficient and said relative shock wave arrival times.

2. The system of claim 1, wherein said discrimination processor calculates an instantaneous signal to noise ratio, which is compared to a potentially data dependent threshold.

3. The system of claim 2, wherein said instantaneous signal to noise ratio is calculated from the following equation:

$$snr_s(i) = \frac{X_s^2(i)}{N_s(i) + \sigma_s}$$

where $N_s$ is the average noise power, $X_s$ is high pass filtered time series data, and $\sigma_s$ is the minimum allowed standard deviation.

4. The system of claim 1, wherein said trajectory estimation processor further estimates a range value for said supersonic projectile using a variant of the Levenberg-Marquardt method of non-linear least squares, wherein residuals are weighed with weights calculated from:

$$\xi_{i,k} = \sigma_i \sqrt{q_{i,k} \sum_m q_{m,k}^{-1}}$$

for each element i on iteration k.

5. The system of claim 1, further including an anti-aliasing filter receiving said pressure wave information signal and suppressing unwanted harmonics in said pressure wave information signals to provide a filtered pressure wave information signal.

6. The system of claim 5, further including an analog to digital (A/D) converter receiving said filtered pressure wave information signal and transforming said filtered pressure wave information signal into the time series information signal.

7. The system of claim 1, wherein said trajectory estimation processor has an initial state comprising initialization values for trajectory parameters.

8. The system of claim 7, wherein said initialization values are calculated from peak voltage from the output of said anti-aliasing filter.

9. The system of claim 7, wherein said initialization values are calculated from the slant range S determined from said peak voltage and said N-wave slope values and fixing two points between which defines a line representing a preliminary trajectory.

10. The system of claim 7, wherein said initialization values are calculated from a global search of a quantized, ranked representation of the entire parameter space.

11. The system of claim 7, wherein said initialization values are calculated from a trajectory estimation determined from the time difference between the arrival of the shock wave at two of said sensors plus the ratio of the amplitudes of the peak voltages for the outputs of their anti-aliasing filters.

12. A method for estimating the trajectory of a supersonic projectile, said projectile producing a pressure wave, said pressure wave having a shock wave, said method comprising the steps of:
   providing at least two spaced apart sensor nodes in known locations;

generating a pressure wave information signal at said sensor nodes in response to said pressure wave;

filtering unwanted harmonics in said pressure wave information signal;

converting said filtered pressure information signal into a time series signal;

recording arrival times of shock wave components of said pressure wave at said sensor nodes;

determining relative arrival times of said shock wave components at each of said sensor nodes;

estimating a ballistic coefficient for said supersonic particle based on a function of peak voltage (Vp) and N-wave slope (V/T) of said time series data; and calculating an estimated trajectory of said projectile based on said ballistic coefficient and said relative shock wave arrival times.

13. The method of claim 12, further comprising the step of calculating slant ranges for said projectile as a function of the caliber of said projectile.

14. The method of claim 13, wherein said supersonic projectile is 50 caliber, and said slant range is computed from the equation:

$$S_1 = 8.37 Vp^{-1.592}.$$

15. The method of claim 13, wherein said supersonic projectile is 30 caliber, and said slant range is computed from the equation:

$$S_1 = 3.06 Vp^{-1.692}.$$

16. The method of claim 13, wherein said supersonic projectile is 22 caliber, and said slant range is computed from the equation:

$$S_1 = 1.41 Vp^{-1.848}.$$

17. The method of claim 13, wherein said supersonic projectile is 50 caliber, and said slant range is computed from the equation:

$$S_2 = 100 (V/T)^{-1.11}.$$

18. The method of claim 13, wherein said supersonic projectile is 30 caliber, and said slant range is computed from the equation:

$$S_1 = 160 (V/T)^{-1.67}.$$

19. The method of claim 13, wherein said supersonic projectile is 22 caliber, and said slant range is computed from the equation:

$$S_2 = 140 (V/T)^{-2}.$$

* * * * *